US012159346B2

(12) United States Patent
Selvet et al.

(10) Patent No.: US 12,159,346 B2
(45) Date of Patent: Dec. 3, 2024

(54) METHODS AND SYSTEM FOR GENERATING 3D VIRTUAL OBJECTS

(71) Applicant: Ready Player Me OÜ, Pärnumaa (EE)

(72) Inventors: Rainer Selvet, Pärnumaa (EE); Andrii Zymohliad, Pärnumaa (EE); Pavel Tšikul, Pärnumaa (EE); Julija Sereda, Pärnumaa (EE); Mikhail Baranau, Pärnumaa (EE); Evgeniia Cheskidova, Tallinn (EE)

(73) Assignee: READY PLAYER ME OÜ, Pärnumaa (EE)

( * ) Notice: Subject to any disclaimer, the term of this patent is extended or adjusted under 35 U.S.C. 154(b) by 164 days.

(21) Appl. No.: 17/777,541

(22) PCT Filed: Sep. 10, 2020

(86) PCT No.: PCT/EP2020/075384
§ 371 (c)(1),
(2) Date: May 17, 2022

(87) PCT Pub. No.: WO2021/099003
PCT Pub. Date: May 27, 2021

(65) Prior Publication Data
US 2024/0029345 A1    Jan. 25, 2024

(30) Foreign Application Priority Data

Nov. 18, 2019  (EP) .................................... 19209819

(51) Int. Cl.
*G06T 17/00*        (2006.01)
*G06T 7/40*         (2017.01)
(Continued)

(52) U.S. Cl.
CPC ................ *G06T 17/00* (2013.01); *G06T 7/40* (2013.01); *G06T 15/04* (2013.01); *G06T 19/20* (2013.01);
(Continued)

(58) Field of Classification Search
CPC .......... G06T 17/00; G06T 7/40; G06T 15/04; G06T 19/20; G06T 2200/24;
(Continued)

(56) References Cited

U.S. PATENT DOCUMENTS 9,959,453 B2   5/2018  Eikelis
10,198,624 B2  2/2019  Li
(Continued)

FOREIGN PATENT DOCUMENTS

WO      2019050808 A1    3/2019

OTHER PUBLICATIONS

Dou, Pengfei et al., (2017). "End-to-End 3D Face Reconstruction with Deep Neural Networks". IEEE Conference on Computer Vision and Pattern Recognition (CVPR). doi:10.1109/cvpr.2017.164.
(Continued)

*Primary Examiner* — Yu Chen
(74) *Attorney, Agent, or Firm* — Tarolli, Sundheim, Covell & Tummino LLP

(57) ABSTRACT

Disclosed are methods and systems for generating 3D avatars. The method comprises inputting a 2D image comprising an object of interest comprising a face; calculating a set of 2D parameters of the object of interest; inputting the set of 2D parameters into a trained neural network; the neural network outputting an estimated set of 3D avatar parameters, said parameters representing deviations with respect to 3D parameters of a benchmark 3D head model; and applying
(Continued)

the set of 3D avatar parameters to the benchmark 3D head model to obtain the 3D avatar. The system comprises a processing component configured for receiving a 2D image comprising an object of interest comprising a face, calculating a set of 2D parameters of the object of interest; and a trained neural network configured for receiving the set of 2D parameters, outputting an estimated set of 3D avatar parameters, said parameters representing deviations with respect to 3D parameters of a benchmark 3D head model; and wherein the processing component is further configured for applying the set of 3D avatar parameters to the benchmark 3D head model to obtain the 3D avatar. Also described is a method for training a neural network to generate 3D objects based on a 2D image. The method comprises creating a benchmark 3D object representing a physical object and comprising a plurality of 3D object parameters, said 3D parameters representing the benchmark 3D object's topology; randomizing the plurality of 3D parameters within predetermined parameter ranges to generate a plurality of synthetic 3D objects representative of the physical object; for each synthetic 3D object, creating a 2D object image; for each 2D object image, calculating a set of 2D object parameters; storing the respective 2D object parameters and the plurality of 3D object parameters for each synthetic 3D object; training a neural network based on the stored 2D object parameters and 3D object parameters pairs.

19 Claims, 8 Drawing Sheets

(51) Int. Cl.
  *G06T 15/04* (2011.01)
  *G06T 19/20* (2011.01)
  *G06V 10/82* (2022.01)
  *G06V 40/16* (2022.01)
(52) U.S. Cl.
  CPC ............ *G06V 10/82* (2022.01); *G06V 40/161* (2022.01); *G06V 40/172* (2022.01); *G06T 2200/24* (2013.01); *G06T 2207/20081* (2013.01); *G06T 2207/20084* (2013.01); *G06T 2207/30201* (2013.01); *G06T 2219/2021* (2013.01); *G06T 2219/2024* (2013.01)
(58) Field of Classification Search
  CPC . G06T 2207/20081; G06T 2207/20084; G06T 2207/30201; G06T 2219/2021; G06T 2219/2024; G06V 40/172; G06V 10/82; G06V 40/161
  See application file for complete search history.

(56) References Cited

U.S. PATENT DOCUMENTS

| | | | | |
|---|---|---|---|---|
| 10,650,564 | B1* | 5/2020 | Lin | G06V 10/82 |
| 11,049,310 | B2* | 6/2021 | Krokhalev | G06T 13/40 |
| 2007/0031028 | A1* | 2/2007 | Vetter | G06V 40/169 382/154 |
| 2014/0043329 | A1* | 2/2014 | Wang | G06T 17/20 345/420 |
| 2015/0244980 | A1* | 8/2015 | Matthews | H04N 19/46 348/14.08 |
| 2017/0372505 | A1* | 12/2017 | Bhat | G06T 7/73 |
| 2018/0158240 | A1* | 6/2018 | Saito | G06V 40/164 |
| 2018/0268207 | A1* | 9/2018 | Kim | G06T 7/269 |
| 2018/0300927 | A1* | 10/2018 | Hushchyn | G06V 40/167 |
| 2019/0035149 | A1* | 1/2019 | Chen | G06V 40/166 |
| 2019/0122411 | A1* | 4/2019 | Sachs | G06T 7/90 |
| 2019/0171868 | A1* | 6/2019 | Taigman | G06V 40/173 |
| 2020/0402284 | A1* | 12/2020 | Saragih | G06T 7/70 |
| 2021/0104086 | A1* | 4/2021 | Wang | G06N 3/045 |

OTHER PUBLICATIONS

Jourabloo, Amin, et al. (2016). "Large-Pose Face Alignment via CNN-Based Dense 3D Model Fitting". IEEE Conference on Computer Vision and Pattern Recognition (CVPR). doi:10.1109/cvpr.2016.454.
International Search Report dated Dec. 3, 2020 for corresponding International Application No. PCT/EP2020/075384.

* cited by examiner

METHODS AND SYSTEM FOR GENERATING 3D VIRTUAL OBJECTS

RELATED APPLICATIONS

The present application is a U.S. National Stage application under 35 USC 371 of PCT Application Serial No. PCT/EP2020/075384, filed on 10 Sep. 2020; which claims priority from EP patent application Ser. No. 19/209,819.2, filed 18 Nov. 2019, the entirety of both of which are incorporated herein by reference.

FIELD

The Invention relates to generating 3D objects. More specifically, the invention relates to generating 3D virtual objects based on 2D images and preferably to generating 3D avatars based on 2D images of faces.

INTRODUCTION

The use of virtual objects and simulated 3D environments has been increasing in many areas of life. It is often desirable to generate a 3D object based on an image or a photograph of a 3D object. Such 3D objects may comprise clothing, furniture, animals, people, scenery, or the like. One particular area of interest is generating human faces for 3D avatars based on images.

Creating recognizable digital 3D representations of people from 2D images is a longstanding problem in computer graphics. With the increasing popularity of virtual and augmented reality applications, personalization in gaming and remote telepresence becomes stronger demand for high quality digital content. Recognizable and aesthetically pleasing 3D avatars play a crucial role in achieving natural communication between digital avatars embodied by remote participants of such applications.

With social networks, gaming, virtual and augmented reality technologies gaining popularity an increasing number of applications benefit from providing their users a way to represent themselves in virtual worlds. A lot of these applications benefit from more authentic social interactions and how users represent themselves in those virtual spaces is a major contributor to the overall social experience. During interactions with other users, for example during a virtual reality meeting, the experience becomes a lot more social and more representative of reality when the digital representations—avatars of the users are similar to how their users look like in reality. One can imagine a virtual reality meeting where all the attendees are using digital avatars that can be recognized by their look and therefore lead to more natural interactions between the attendees. A 3D digital avatar in this context is considered to be a digital 3D asset that represents a specific person and can be rendered with 3D computer graphics technologies in 3D environments.

Often games, virtual reality or augmented reality applications provide the user with a select number of premade avatars they can pick from in order to represent themselves within the virtual space. This solution however presents multiple issues. In case the selection of avatars is limited to a certain number of premade avatars, it can result in people in the same virtual space looking identical. Therefore, it is more difficult to feel immersed in social interactions happening in those virtual spaces as the subjects embody no unique characteristics which we are used to in real face-to-face conversations. In addition, it is less practical to find a specific person in a virtual space if everyone is visually indistinguishable from each other and based off of a common default character.

The avatars used in such scenarios lack the personality and recognizability of their users. A more sophisticated solution is required for a person not skilled in 3D technology to create a recognizable virtual representation of themselves. The purpose of automatic generation and stylization of a personal avatar is to provide users an easy-to-use interface by the means of capturing a single photograph of themselves to create and stylize a digital avatar of themselves.

Common approaches for generating 3D avatars from a single photo includes a method that estimates the 3D geometry of a face by first identifying a set of 2D landmarks in the photo followed by linear morphing of the 3D geometry to matching 2D landmarks. Although it is usually computationally fast, the solution often results in avatars which have very generic facial geometry and lack the subject's correct facial shape features. The quality of the generated avatar relies on the accuracy of the detected face landmarks which can be incorrectly detected due to inconsistencies in field of view, subject's head pose or undesired lightning conditions when the photograph is captured. The resulting 3D face reconstructions lack detail as the facial shape information is captured from a single set of 2D landmarks.

Morphable Model

Another common approach used for 3D avatar generation describes how the 3D geometry of a face is created by utilizing a linear representation of a 3D shape—a morphable model. 2D landmarks are found on an input photograph which are then used to guide fitting of a 3D morphable model parameters to match the face visible on the photograph. The morphable model is created based on a linear combination of a number of 3D face scans. This approach requires a large database of 3D scans to be effective. Having a large and diverse real-world database of facial scans, the quality, size of the dataset and diversity in it is tightly coupled with the quality of the end result. The representation capability is often limited due to lack of good quality 3D scan data. As with 2D fitting, landmarks must be located precisely in the Input Image in order to achieve accurate results. Variations in pose and illumination can affect the accuracy of the detected landmarks and therefore result in bad quality avatars.

Due to the limited expressiveness of the morphable model and the inaccuracy of landmark detection, most existing methods are not robust to pose and illumination variations.

Some known techniques for generating virtual avatars or digital human faces are described as follows.

US patent application 20180158240 A1 discloses a method for generating three-dimensional facial models and photorealistic textures from inferences using deep neural networks relies upon generating a low frequency and a high frequency albedo map of the full and partial face, respectively. Then, the high frequency albedo map may be used for comparison with correlation matrices generated by a neural network trained by a large scale, high-resolution facial dataset with simulated partial visibility. The corresponding correlation matrices of the complete facial textures can then be retrieved. Finally, a full facial texture map may be synthesized, using convex combinations of the correlation matrices. A photorealistic facial texture for the three-dimensional face rendering can be obtained through optimization using the deep neural network and a loss function that incorporates the blended target correlation matrices.

U.S. Pat. No. 9,959,453 B2 discloses a system for rendering a merged virtual 3D augmented replica of a 3D product image and a 3D model image of a body part. A 3D modeling engine transforms an acquired 2D image of a body part into a 3D augmented replica thereof. A GUI enables the merging, displaying and manipulating of the 3D product image and the 3D augmented replica of a body part.

US patent application 2007/0031028 A1 describes an improved algorithm for estimating the 3D shape of a 3-dimensional object, such as a human face, based on information retrieved from a single photograph by recovering parameters of a 3-dimensional model and methods and systems using the same. Beside the pixel intensity, the invention uses various image features in a multi-features fitting algorithm (MFF) that has a wider radius of convergence and a higher level of precision and provides thereby better results.

International patent application WO 2019/050808 A1 discloses a system for generating three-dimensional facial models including photorealistic hair and facial textures includes creating a facial model with reliance upon neural networks based upon a single two-dimensional input image. The photorealistic hair is created by finding a subset of similar three-dimensional polystrip hairstyles from a large database of polystrip hairstyles, selecting the most-alike polystrip hairstyle, deforming that polystrip hairstyle to better fit the hair of the two-dimensional image. Then, collisions and bald spots are corrected, and suitable textures are applied. Finally, the facial model and polystrip hairstyle are combined into a final three-dimensional avatar.

U.S. Pat. No. 10,198,624 B2 describes a system and method of performing facial recognition from RGB image data. The method includes generating a lower-resolution image from the RGB image data, performing a convolution of the lower-resolution image data to derive a probability map identifying probable facial regions and a probable non-facial regions, and performing a first deconvolution on the lower-resolution image using a bilinear interpolation layer to derive a set of coarse facial segments. The method further includes performing a second deconvolution on the lower-resolution image using a series of unpooling, deconvolution, and rectification layers to derive a set of fine facial segments, concatenating the set of coarse facial segments to the set of fine facial segments to create an image matrix made up of a set of facial segments, and generating a binary facial mask identifying probable facial regions and probable non-facial regions from the image matrix.

SUMMARY

It is the object of the present invention to provide a new and improved way of generating 3D virtual objects based on a 2D input image. It is further the object to provide a method and system for generating such 3D virtual objects. It is another object to describe a training method for a neural method so as to enable the generation of 3D virtual objects based on 2D input Images. It is also a particular object to describe generation of 3D avatars based on 2D images of human faces.

Presented are systems and methods for automatic generation and stylization of 3D avatars from 2D photographs. A photograph of a human subject including a face is used to generate a personal stylized 3D avatar. Further stylization and customization of geometry and texture of the avatar into desired styles via facial shape parameterization and texture processing techniques is explained. A novel approach for dataset synthezation is explained used for training a robust 3D face shape prediction algorithm for any face.

The described invention provides end users of those applications an ability to generate aesthetically pleasing and recognizable digital avatar of themselves from a single photograph without prior technical expertise. The invention allows developers of those applications to enhance the social experiences their users have.

Creating virtual avatars of human subjects is a common task in the computer graphics industry when it often takes hours or days of manual work by skilled artists and developers to create one character. The described invention is capable of generating 3D avatars automatically in a matter of seconds, providing a faster and more cost effective solution for 3D content creation at scale. In addition automatic avatar generation provides application end users the ability to create a digital representation of themselves without prior knowledge or technical expertise, increasing the scalability of such personalization features.

Described is a system that can without any manual intervention generate 3D avatars of human subjects from a single photograph and stylize the mesh and texture components of those avatars to achieve a unique aesthetic and technical requirement. A 3D avatar is a collection of 3D and 2D components. The mesh component of a 3D avatar describes the surface of a polygonal 3D model—a collection of vertices each represented as a coordinate in 3D space.

The texture component describes the surface color information—the subject's face mapped onto a visual representation of the mesh component flattened onto a two-dimensional plane.

Each point on the two-dimensional plane is called a UV and represents a vertex on the mesh component collectively described as a UV layout. The style template component of a 3D avatar describes how the aesthetic look of the avatar should be altered to match a certain style specification. A style template describes a process with a series of steps to achieve a certain aesthetic and technical goal while transforming the avatar from its original shape and texture into a new style. During this process the mesh component as well as the texture component of the avatar is transformed with certain parameters. The resulting 3D avatar can be used as a digital representation of a subject.

The described invention uses 2D landmarks only for 3D avatar texturing purposes and does not rely on 2D landmarks for 3D mesh component generation. Therefore, for 3D mesh component generation the described invention is not strongly reliant on pose and illumination. Furthermore, the 3D mesh component is not strongly reliant on subject's facial expression.

In a first embodiment, a method for generating a 3D virtual object is disclosed. The method comprises inputting a 2D image comprising an object of interest. The method further comprises calculating a set of 2D parameters of the object of interest. The method also comprises inputting the set of 2D parameters into a trained neural network. The method further comprises the neural network outputting an estimated set of 3D object parameters, said parameters representing deviations with respect to 3D parameters of a benchmark 3D object. The method also comprises applying the set of 3D object parameters to the benchmark 3D object to obtain the 3D virtual object.

The 3D virtual object can preferably comprise an avatar. As used in the present document, the skilled person will understand that some embodiments referring to a 3D virtual object or a 3D object can be interpreted as referring to the 3D avatar or simply avatar specifically. In a similar vein, when embodiments refer to 2D object, a face or an image of a human head in a photograph can be meant as the 2D object.

The benchmark 3D object preferably comprises a head model, more preferably a morphable head model. In other words, the benchmark 3D object may correspond to a default "blank" 3D head avatar that can be morphed or "adjusted" in a plurality of ways according to the 3D object parameters computed by the present method. The 3D object parameters may correspond to avatar parameters.

The present method can be preferably implemented to generate 3D avatars of human faces based on (preferably) a single 2D photograph or image. It allows to quickly create a high-quality avatar that accurately represents the person of the photograph. Advantageously, the method can be used for many applications from virtual meetings or classrooms to gaming and the like.

The 2D parameters of the object of interest may preferably correspond to parameters representing topology of a face detected in a photograph comprising the face. Preferably, such 2D parameters are not landmarks detected directly from by analysing the image, but rather an output of a neural network or the like, which has been trained on a plurality of facial photographs. In other words, the 2D parameters may be obtained by running the input image through a neural network that outputs parameters representing the detected face. The neural network may comprise a publicly available one that may be further modified to fit the particular purpose at hand.

Put differently, the 2D parameters may correspond not to coordinates on the 2D image corresponding to different parts of the face (such as a collection of pixels belonging to the nose), but rather a set of floating point values that generally describe the detected human face (preferably obtained as an output of a separate neural network that has been trained on a set of images comprising a plurality of different human faces shown under different lightning conditions and exhibiting a large amount of diversity). This can be referred to as facial recognition embedding. Using such facial recognition embedding (2D parameters) Instead of merely detecting and assigning facial landmarks advantageously leads to better quality avatars.

The method can be particularly advantageous, in that better 3D virtual objects can be obtained than those obtained by conventional methods. This is due to, particularly, using the 2D parameters (preferably corresponding to facial recognition embedding) as an input into a specifically trained neural network to obtain a 3D mesh (3D parameters) corresponding to the face detected in the original input image, and then preferably combining the output 3D mesh with the textures obtained via landmark detection in the originally input image. This can advantageously allow to use the detected landmarks for avatar texturing purposes only, allowing to reduce the time needed to generate the avatar and improve its quality.

In some preferred embodiments, the object of interest can comprise a face. Preferably, the object of interest comprises a human face. In other words, the input to the method may comprise an image or a photograph comprising a human face.

In some preferred embodiments, the 3D virtual object can comprise a head avatar based on a morphable head model. That is, the generated avatar can comprise a head model adjusted to resemble the face of the 2D photograph. The morphable head model can be pre-generated and can comprise a plurality of morphable parameters which allow it to be deformed to resemble any input 2D face.

In some embodiments, the output 3D virtual object can comprise a 3D avatar based on a single image of a human face. In other words, the 3D avatar may be built without requiring photos to be taken from a plurality of angles, and/or a plurality of images to be taken.

Preferably, the avatar is also generated quickly and efficiently and accurately represents the features of the input human face (that is, typical features such as a wide forehead, high cheekbones, large eyes, or the like).

In some embodiments, the 2D image can comprise a photo taken by a camera. In such embodiments, the method can further comprise, prior to all the other steps, the step of capturing the photo. The photo can further be captured via a user-operated terminal. This can be particularly advantageous, since the present method may allow a user to quickly and efficiently build a virtual avatar of themselves by taking a single picture on their personal computing device (such as a smartphone, tablet, wearable device, or the like). Additionally or alternatively, the avatar may then be output to the user. They may choose to adjust or redo it based on their satisfaction.

In some embodiments, the method can further comprise, prior to all other steps, the step of detecting an object of interest in an input image. If the first step is taking the image via a user-operated terminal, this step would come after that first step. This can allow to reject photos where there is no object of interest (preferably a face) in the input image and/or where it is concealed/obscured to a degree that would not allow for a generation of an accurate avatar. Detecting the object of interest can comprise running a face detection algorithm on the input image. This can be a standard face detection algorithm known in the art.

In some embodiments, the method can further comprise displaying the 3D virtual object via a graphical interface. The interface may comprise a browser, and app and/or a program run on a computing device and/or a server.

In some embodiments, the method can further comprise using the generated 3D virtual object within a virtual interaction environment. In such embodiments, the method can further comprise animating the 3D virtual object within the virtual interaction environment. In such embodiments, the method can further comprise combining the 3D virtual object with a pre-generated virtual object and enabling interaction between the 3D virtual object and the pre-generated virtual object.

The virtual interaction environment can comprise any graphical interface where one or more persons may interact in different ways. For example, such an environment may comprise a virtual classroom (with the 3D virtual object corresponding to an avatar of a teacher and/or students), a virtual meeting room (with the 3D objects corresponding to various meeting participants), a video game, a work simulation, or the like.

Advantageously, using the 3D avatar within such an environment may allow for more natural interactions between different users. For example, a virtual business meeting where persons are represented by accurate avatars of themselves may be more productive and efficient than one where neutral avatars are used.

In some embodiments, the method can further comprise applying a stylization to the generated 3D virtual object. In other words, the generated object (such as an avatar) can be changed or adapted to fit a particular style or the like. This can be useful, for example, to emphasize that the generated avatar is a virtual entity and not a video recording or the like of the person. Additionally or alternatively, it may advantageous to show the avatar in a specific style of drawing or animation to fit different needs and possibly different virtual environments.

Applying a stylization can comprise applying a transformation to at least a subset of the set of 3D object parameters. For example, when the 3D object comprises a virtual avatar of a human head, the transformation may comprise adjusting features such as eye size, nose shape, lip fullness or the like to emphasize certain features or to fit the resulting stylized avatar to a certain visual style. The transformation can comprise a translation applied to a subset of the set of 3D object parameters. In other words, the parameters may be defined as multidimensional vectors or the like describing various features of the face. The translation or a plurality of translations can adjust them and thereby change the style of the avatar.

In some such embodiments, the stylization can be dependent on the set of 3D object parameters. That is, different transformation can be applied to different avatars, and the specific parameters of such stylizations (such as the amount of translation and/or which parameters should be translated) can depend on the values of the parameters defining each of the avatars.

In some such embodiments, the stylization can comprise a transformation of the generated avatar into a preselected digital style. Such a style can comprise a humorous or caricature style, a western or eastern cartoon style, a more or less serious style and the like.

The stylization may be performed in a way that not affect general facial features of the generated avatar. That is, a particularly prominent chin may remain so after the stylisation is applied. This can help preserve the overall likeness of the avatar to the original image and ensure that no defining features are distorted.

In some such embodiments, prior to applying stylization, the stylization can be tailored to facial features of the generated avatar based on predetermined criteria.

In some embodiments, the method can further comprise texturing the 3D virtual object.

Texturing may refer to providing the correct textures (such as color/patterns and the like) to the object. In the preferred embodiment of the 3D avatar, texturing may refer to conveying different colors and textures of the skin of the person's face to the avatar. Put simply, texturing may comprise altering the input image through texture generation and processing and saving the resulting as an image and/or as a byte array in device memory.

In some such embodiments, texturing can comprise detecting 2D landmarks and a plurality of textures on the 2D image. That is, independently of generating the 3D object, the 2D input image may be separately processed to extract the relevant textures. It can be particularly useful to separate texture extraction from 3D object generation, since it advantageously allows for quicker processing and reduces inaccuracies in the resulting avatar. The 2D landmarks may comprise features such as distance between the eyes, width of the forehead or the like.

In some such embodiments, texturing can further comprise transforming the detected 2D landmarks into pre-defined target 2D landmarks. The transformation can preferably be affine, so that distortion is minimized.

Texturing can then further comprise warping the detected textures onto the predefined target 2D landmarks.

Texturing can then further comprise baking the warped texture onto a predetermined layout.

This can then allow to directly apply the resulting texture onto a 3D virtual object, preferably an avatar. The predetermined layout can preferably comprise a UV layout.

In such preferred embodiments, texturing can further comprise applying the baked texture to the 3D virtual object.

Since 3D virtual objects preferably comprise pre-defined UV maps (2D layouts of 3D objects) which 2D coordinates match the textures that are output, the texture output can be seamlessly applied onto the 3D virtual object.

In some embodiments, the method can further comprise processing the detected textures.

In some such embodiments, processing can comprise at least one of cleaning up textures, enhancing textures, correcting texture exposure, smoothing texture shadows and highlighting. These are all optional steps that can lead to better overall quality of the generated 3D object, but can also be dispensed with when quicker generation of the object is needed.

In some embodiments, the method can further comprise stylizing the detected textures. In other words, stylisation may comprise stylizing the generated 3D object as well as the textures applied to it. For example, colors of various parts of the generated avatar may be stylized depending on the desired avatar environment.

In some embodiments, detecting an object of interest can comprise running a face detection algorithm on the 2D image and detecting at least one face. Such an algorithm can be a standard face detection algorithm known in the art. Calculating a set of 2D parameters can then comprise calculating a facial recognition embedding for the face detected in the 2D image.

In some embodiments, the 3D object parameters can comprise facial blend shapes.

In some embodiments, each of the 3D object parameters can comprise a vertex in a multidimensional vector space.

In some embodiments, the benchmark 3D object can comprise a morphable head model.

Such a morphable head model may be pre-generated in a way that allows morphing (that is, modification) of a plurality of parameters to change the benchmark head model into a specific avatar. Put simply, features of the morphable head model may be changed individually so as to arrive at facial features corresponding to those of the person on the input image. The morphable head model itself may comprise neutral or simply default features and may be androgynous. Additionally or alternatively, there may be a plurality of morphable head models used as starting points depending on the input photograph. For example, there may be a different morphable head model for female appearing images and male appearing images, as well as different morphable head models for different ethnicities.

In some such embodiments, the morphable head model can comprise a linear combination of variable vertices configured to represent a plurality of different facial shapes.

In some embodiments, the method can further comprise, prior to inputting the 2D parameters into a trained neural network, training the neural network to output 3D object parameters given an input of 2D parameters.

The training of the neural network can comprise creating a benchmark 3D object representing a physical object and comprising a plurality of 3D object parameters, said 3D parameters representing the benchmark 3D object's topology. The benchmark 3D object can preferably comprise a morphable head model.

Training the neural network can then further comprise randomizing the plurality of benchmark 3D object's 3D parameters within predetermined parameter ranges to generate a plurality of synthetic 3D objects representative of the physical object. The plurality of synthetic 3D objects can comprise a plurality of human head models, the heads corresponding to realistic human head representations. In other words, different synthetic human head avatars can be generated to better train the neural network. Randomizing the parameters defining such synthetic avatars can advantageously allow to expose the neural network to more facial diversity, and thereby improve its robustness and accuracy. The predetermined parameter ranges may correspond to different theoretically possible ranges of human face features. For example, the width of the mouth may range from the narrowest realistically possible mouth to a widest realistically possible mouth.

Training the neural network can further comprise creating a 2D object image for each synthetic 3D object. In the case of avatars, this means that for each synthetic human head avatar, a corresponding 2D image corresponding to a face may be created. The 2D object image can correspond to a projection of the 3D object and comprise an image of a synthetically generated human head.

Training the neural network can further comprise calculating a set of 2D object parameters for each 2D object image. The 2D object parameters can correspond to facial recognition embedding.

Training the neural network can further comprise storing the respective 2D object parameters and the plurality of 3D object parameters for each synthetic 3D object. Then, training the neural network can further comprise training it based on the stored 2D object parameters and 3D object parameters pairs. In this way, to train the neural network, a dataset comprising pairs of 3D objects (such as avatars) and their corresponding 2D objects (such as Images of faces) can be used. When generating such a dataset, it can be much quicker and simpler to start with synthetically generated avatars and then use a projection or another similar transformation to obtain 2D images corresponding to them. Then, having trained on such generated pairs, the neural network can be used to generate the 3D avatars based on the 2D images, thereby performing the process in reverse.

In fact in order to build the training data for the neural network, textures can be used as well. In that case when a 2D object image is created for each synthetic 3D object, the synthetic 3D object may have a face texture. These face textures in that case can be pre-defined or sometimes even hand-crafted. The reason for using textures when the synthetic training data is generated can be to make the output of the step of calculating a set of 2D object parameters (preferably facial recognition embedding) more accurate.

The training of the neural network can also comprise calculating a linear regression function that given an input 2D object parameters provides output 3D object parameters describing the 3D virtual object. The 2D object parameters can comprise facial recognition embedding and 3D object parameters comprise blend shapes describing the facial shape and the 3D virtual object comprises an avatar of a human head.

In a second embodiment, a system for generating a 3D virtual object is described. The system comprises a processing component configured for receiving a 2D image comprising an object of interest and calculating a set of 2D parameters of the object of interest. The system further comprises a trained neural network configured for receiving the set of 2D parameters and outputting an estimated set of 3D object parameters, said parameters representing deviations with respect to 3D parameters of a benchmark 3D object. The processing component is further configured for applying the set of 3D object parameters to the benchmark 3D object to obtain the 3D virtual object.

The definitions and specific implementations as regards the present terms (such as 3D virtual objects generally corresponding to 3D avatars herein) as described with reference to method embodiments above apply to the system embodiments here as well.

The object of interest can preferably comprise a face. That is, the input to the system comprises an image comprising a face, preferably a human face. The 3D virtual object can preferably comprise a head avatar (or simply avatar) based on a morphable head model.

In some embodiments, the 2D image can comprise a photo taken by a camera. Preferably, the image can be taken via a user interface on a user-operated terminal. This can comprise a personal computing device such as a smartphone, a laptop, a PC, a wearable device, or the like.

The system can further comprise a training database. The training database can be configured for storing a plurality of synthetically generated 3D objects for training the neural network.

Preferably, the training database can store pairs of synthetically generated avatars and the corresponding 2D images corresponding to "faces" of such synthetic avatars.

The system can further comprise an output component configured to output the 3D virtual object. The output component can comprise a graphical interface. For example, this can comprise a browser, an app, a program or the like.

In some embodiments, the system can further comprise an input component configured to capture and input a 2D image to the processing component. The input component can comprise a user-operated device.

The system can further comprise a 3D object database. The 3D object database can be configured to store a plurality of generated 3D virtual objects.

In some embodiments, the processing component can be further configured to detect an object of interest in an arbitrary input image.

Preferably, the system as described in all the system embodiments can be configured to carry out the method according to any of the preceding method embodiments.

In a third embodiment, a method for training a neural network to generate 3D objects based on a 2D image is described. The method comprises creating a benchmark 3D object representing a physical object and comprising a plurality of 3D object parameters, said 3D parameters representing the benchmark 3D object's topology. The method also comprises randomizing the plurality of 3D parameters within predetermined parameter ranges to generate a plurality of synthetic 3D objects representative of the physical object. The method further comprises, for each synthetic 3D object, creating a 2D object image. The method also comprises for each 2D object image, calculating a set of 2D object parameters. The method further comprises storing the respective 2D object parameters and the plurality of 3D object parameters for each synthetic 3D object. The method also comprises training a neural network based on the stored 2D object parameters and 3D object parameters pairs.

The present method can be advantageously used to teach a neural network to build realistic and accurate 3D objects (preferably avatars) based on single input 2D images comprises a 2D object of interest (preferably a face).

The method can further comprise using the trained neural network to output 3D object parameters given an input of 2D object parameters.

Preferably, the benchmark 3D object can comprise a morphable head model. The 3D parameters can comprise a plurality of blend shapes, said blend shapes representing a plurality of morphable facial regions.

In some embodiments, the method can further comprise, for each synthetic 3D object, generating at least one face texture.

In a fourth embodiment, a method for training a neural network to output 3D avatar parameters is disclosed. The method comprises generating a training dataset by collecting a plurality of images, each comprising a different human face, for each image, inputting 2D parameters describing the face depicted in it, for each image, inputting ground truth 3D parameters corresponding to the human face depicted in it, and storing the pairs of the 2D parameters and the corresponding ground truth 3D parameters together. The method further comprises inputting 2D parameters corresponding to each image into a neural network. The method also comprises the neural network outputting estimated 3D parameters based on the input 2D parameters. The method further comprises comparing the estimated 3D parameters with the ground truth 3D parameters. The method also comprises using the comparison to improve the neural network's subsequent output of the estimated 3D parameters.

The present training method can be used as an alternative to the previously described training method. This method may be referred to as wolfcoder method. The trained neural network resulting from applying this method can be used to carry out the method according to the previously described first embodiment. The present training method is also described with reference to FIGS. 8 to 11.

A difference to the previous training method is that presently, the results output by the neural network are compared to a "ground truth", and subsequently improved based on this comparison. This can lead to particularly high quality avatars once the neural network is trained and can be applied to arbitrary images. To implement the present training method, however, a more involved training process may be needed to generate the training dataset.

That is, the dataset should comprise the "ground truth" 3D facial representation, such as an output of an elaborate 3D scan of a human face, together with a photograph of the same face. Therefore, it may be more technically challenging to implement the method, although the output may be advantageously better.

In some embodiments, the present method can further comprise generating the 2D parameters describing the face in the image by inputting the image into a facial recognition neural network. In other words, a standard or known facial recognition algorithm can be used to obtain a face descriptor.

In some embodiments, the present method can further comprise generating the 3D ground truth parameters by performing 3D scans of the human face depicted in each image. As previously described, this can advantageously allow to compare the "first attempts" of the neural network to generate a 3D representation of a face with what is already known to correspond to a given face, thereby giving the neural network feedback, so that it can improve.

In some embodiments, Improving the neural network's output is performed by a backpropagation process. In other words, a backpropagation algorithm can be used to "teach" the neural network how it can better generate 3D parameters for a given face.

The trained neural network can then be configured to carry out the method according to any of the previously described embodiments corresponding to the first embodiment of the present disclosure.

In a fifth embodiment, a method for generating a 3D object is disclosed. The method comprises generating a benchmark 3D object comprising a set of variable coefficients by using a dataset comprising a plurality of images comprising benchmark 2D objects of interest. The method also comprises training a linear regression model to output optimized set of coefficients based at least on an input image with a 2D object of interest. The method further comprises inputting a new image comprising a 2D object of interest into the trained model. The method also comprises generating the 3D object corresponding to the 2D object of interest by applying the optimized set of coefficients to the benchmark 3D object.

The present method can be advantageously used to generate 3D head models corresponding to 3D photographs of faces. In some preferred embodiments, the 3D object can comprise a 3D head model, the benchmark 3D object can comprise a morphable 3D head model, and the 2D object of interest can comprise a face photograph.

In some preferred embodiments, the method can be performed by using principal component analysis (PCA) algorithm. This type of analysis can allow for quicker processing type while ensuring an accurate representation of the resulting 3D head model. This is possible due to the possibility to reduce the dimensions or numbers of principal components used in the method without significantly affecting the quality of the resulting head model. In other words, the principal component analysis ensures that most recognizable facial features are encoded in the first few principal components, with the tall end of the principal components not affecting the overall impression of the head model. Therefore, discarding this tall end can ensure streamlined calculations without affecting quality.

In some embodiments, generating the benchmark 3D object can comprise extracting facial recognition embedding from the benchmark face photographs. The facial recognition embeddings can be as described above. They generally correspond to multidimensional vectors reflecting characteristics of the face detected in the photographs.

In some such embodiments, the method can further comprise applying principal component analysis to the set of all extracted facial recognition embeddings. As also mentioned above, using the PCA method can advantageously allow to reduce the dimensionality of the 2D input converted into a vector, and therefore the number of coefficients representing the resulting 3D head model. This reduction of dimensionality advantageously allows to optimize computation times while not reducing the quality of the resulting 3D head model.

In some such embodiments, the method can further comprise reducing dimensionality of resulting principal component basis. The dimensionality can be reduced by picking a predetermined number of first principal components. In such embodiments, the method can further comprise constructing the benchmark 3D object by using the retained principal components. Advantageously, physical characteristics most responsible for the correspondence between the 2D face photograph and the 3D head model are represented by the first few principal components. For example, the first 20 to 80, or around 50 principal components may be retained.

In some embodiments, training the linear regression model can comprise inputting facial recognition embeddings corresponding to benchmark face photographs. The training can also further comprise converting the facial recognition embeddings into principal component basis and outputting coefficients corresponding to 3D head models of the input 2D face photographs. The training can further comprise optimizing difference between the output coefficients and actual coefficients corresponding to the benchmark 2D face photographs.

In some embodiments, Inputting a new image comprising a 2D face can further comprise extracting facial recognition embedding of the face of the input new image.

In some embodiments, generating the 3D head model corresponding to the new input image can further comprise using the coefficients output by the trained model to generate the new 3D head model.

In some embodiments, the method can further comprise generating a texture corresponding to the 2D object of interest of the new image. The texture can also be generated by using the principal component analysis. Similarly to the facial shape obtained via the facial recognition embedding, the texture can be obtained by first training the model on a texture dataset, and then using the trained model to output the texture of a new input.

The present invention is also defined by the following numbered embodiments.

Below is a list of method embodiments. Those will be indicated with a letter "M". Whenever such embodiments are referred to, this will be done by referring to "M" embodiments.

M1. A method for generating a 3D virtual object, the method comprising
- Inputting a 2D image comprising an object of interest;
- Calculating a set of 2D parameters of the object of Interest;
- Inputting the set of 2D parameters into a trained neural network;
- The neural network outputting an estimated set of 3D object parameters, said parameters representing deviations with respect to 3D parameters of a benchmark 3D object;
- Applying the set of 3D object parameters to the benchmark 3D object to obtain the 3D virtual object.

Embodiments Related to Specifying the Method to Facial Recognition

M2. The method according to the preceding embodiment wherein the object of Interest comprises a face.

M3. The method according to the preceding embodiment wherein the 3D virtual object comprises a head avatar based on a morphable head model.

M4. The method according to any of the preceding embodiments wherein the output 3D virtual object comprises a 3D avatar based on a single image of a human face.

Embodiments Related to Specifying the Origin of the Image & the Application of the 3D Avatar M5. The method according to any of the preceding embodiments wherein the 2D image comprises a photo taken by a camera.

M6. The method according to the preceding embodiment further comprising, prior to all the other steps, the step of capturing the photo.

M7. The method according to the preceding embodiment wherein the photo is captured via a user-operated terminal.

M8. The method according to any of the preceding embodiments further comprising, prior to all other steps, the step of detecting an object of Interest in an input image.

M9. The method according to the preceding embodiment wherein detecting the object of Interest comprises running a face detection algorithm on the input image.

M10. The method according to any of the preceding embodiments further comprising, displaying the 3D virtual object via a graphical Interface.

M11. The method according to any of the preceding embodiments further comprising using the generated 3D virtual object within a virtual Interaction environment.

M12. The method according to the preceding embodiment further comprising animating the 3D virtual object within the virtual Interaction environment.

M13. The method according to any of the two preceding embodiments further comprising combining the 3D virtual object with a pre-generated virtual object and enabling Interaction between the 3D virtual object and the pre-generated virtual object.

Embodiments Related to Stylization of the 3D Object

M14. The method according to any of the preceding embodiments further comprising applying a stylization to the generated 3D virtual object.

M15. The method according to the preceding embodiment wherein applying a stylization comprises applying a transformation to at least a subset of the set of 3D object parameters.

M16. The method according to the preceding embodiment wherein the transformation comprises a translation applied to a subset of the set of 3D object parameters.

M17. The method according to any of the three preceding embodiments wherein the stylization is dependent on the set of 3D object parameters.

M18. The method according to any of the four preceding embodiments and with features of embodiment M3 wherein the stylization comprises a transformation of the generated avatar into a preselected digital style.

M19. The method according to any of the five preceding embodiments and with features of embodiment M3 wherein the stylization does not affect general facial features of the generated avatar.

M20. The method according to any of the six preceding embodiments and with features of embodiment M3 wherein, prior to applying stylization, the stylization is tailored to facial features of the generated avatar based on predetermined criteria.

Embodiments Related to Texturing of the 3D Object

M21. The method according to any of the preceding method embodiments further comprising texturing the 3D virtual object.

M22. The method according to the preceding embodiment wherein texturing comprises
- Detecting 2D landmarks and a plurality of textures on the 2D Image.

M23. The method according to the preceding embodiment wherein texturing further comprises
- Transforming the detected 2D landmarks into predefined target 2D landmarks.

M24. The method according to the preceding embodiment wherein texturing further comprises
- Warping the detected textures onto the predefined target 2D landmarks.

M25. The method according to the preceding embodiment wherein texturing further comprises
- Baking the warped texture onto a predetermined layout.

M26. The method according to the preceding embodiment wherein texturing further comprises
- Applying the baked texture to the 3D virtual object.

M27. The method according to the preceding embodiment wherein the predetermined layout comprises a UV layout.

M28. The method according to any of the six the preceding embodiments further comprising
Processing the detected textures.

M29. The method according to the preceding embodiment wherein processing comprises at least one of
Cleaning up textures;
Enhancing textures;
Correcting texture exposure;
Smoothing texture shadows and highlighting.

M30. The method according to any of the four preceding embodiments further comprising stylizing the detected textures.

Embodiments Related to the 2D Image

M31. The method according to any of the preceding method embodiments and with features of embodiment M2 wherein the detecting an object of Interest comprises running a face detection algorithm on the 2D image and detecting at least one face.

M32. The method according to the preceding embodiment wherein calculating a set of 2D parameters comprises calculating a facial recognition embedding for the face detected in the 2D Image.

Embodiments Related to the 3D Object

M33. The method according to any of the preceding embodiments and with features of embodiment M2 wherein the 3D object parameters comprise facial blend shapes.

M34. The method according to any of the preceding method embodiments wherein each of the 3D object parameters comprises a vertex in a multidimensional vector space.

M35. The method according to any of the preceding method embodiments and with features of embodiment M2 wherein the benchmark 3D object comprises a morphable head model.

M36. The method according to the preceding embodiment wherein the morphable head model comprises a linear combination of variable vertices configured to represent a plurality of different facial shapes.

Embodiments Related to Neural Network Training and Use

M37. The method according to any of the preceding method embodiments further comprising, prior to Inputting the 2D parameters into a trained neural network,
Training the neural network to output 3D object parameters given an input of 2D parameters.

M38. The method according to the preceding embodiment wherein training of the neural network comprises
Creating a benchmark 3D object representing a physical object and comprising a plurality of 3D object parameters, said 3D parameters representing the benchmark 3D object's topology.

M39. The method according to the preceding embodiment wherein the benchmark 3D object comprises a morphable head model.

M40. The method according to any of the two preceding embodiments wherein training the neural network further comprises
Randomizing the plurality of benchmark 3D object's 3D parameters within predetermined parameter ranges to generate a plurality of synthetic 3D objects representative of the physical object.

M41. The method according to the preceding embodiment wherein the plurality of synthetic 3D objects comprise a plurality of human head models, the heads corresponding to realistic human head representations.

M42. The method according to any of the two preceding embodiments wherein training the neural network further comprises
For each synthetic 3D object, creating a 2D object image.

M43. The method according to the preceding embodiment wherein the 2D object Image corresponds to a projection of the 3D object and comprises an image of a synthetically generated human head.

M44. The method according to any of the two preceding embodiments wherein training the neural network further comprises
For each 2D object image, calculating a set of 2D object parameters.

M45. The method according to the preceding embodiment wherein the 2D object parameters correspond to facial recognition embedding.

M46. The method according to any of the two preceding embodiments wherein training the neural network further comprises
Storing the respective 2D object parameters and the plurality of 3D object parameters for each synthetic 3D object.

M47. The method according to the preceding embodiment wherein training the neural network further comprises
Training a neural network based on the stored 2D object parameters and 3D object parameters pairs.

M48. The method according to the preceding embodiment wherein the training comprises
Calculating a linear regression function that given an input 2D object parameters provides output 3D object parameters describing the 3D virtual object.

M49. The method according to the preceding embodiment wherein the 2D object parameters comprise facial recognition embedding and 3D object parameters comprise blend shapes describing the facial shape and the 3D virtual object comprises an avatar of a human head.

Below is a list of system embodiments. Those will be Indicated with a letter "S". Whenever such embodiments are referred to, this will be done by referring to "S" embodiments.

S1. A system for generating a 3D virtual object, the system comprising
A processing component configured for
Receiving a 2D image comprising an object of Interest;
Calculating a set of 2D parameters of the object of Interest; and
A trained neural network configured for
Receiving the set of 2D parameters;
Outputting an estimated set of 3D object parameters, said parameters representing deviations with respect to 3D parameters of a benchmark 3D object; and
Wherein the processing component is further configured for applying the set of 3D object parameters to the benchmark 3D object to obtain the 3D virtual object.

S2. The system according to the preceding embodiment wherein the object of Interest comprises a face.

S3. The system according to the preceding embodiment wherein the 3D virtual object comprises a head avatar based on a morphable head model.

S4. The system according to any of the three preceding embodiments wherein the 2D image comprises a photo taken by a camera.

S5. The system according to any of the five preceding embodiments further comprising a training database.

S6. The system according to the preceding embodiment wherein the training database is configured for storing a plurality of synthetically generated 3D objects for training the neural network.

S7. The system according to any of the preceding system embodiments further comprising an output component configured to output the 3D virtual object.

S8. The system according to the preceding embodiment wherein the output component comprises a graphical Interface.

S9. The system according to any of the preceding system embodiments further comprising an input component configured to capture and input a 2D Image to the processing component.

S10. The system according to the preceding embodiment wherein the input component comprises a user-operated device.

S11. The system according to any of the preceding system embodiments further comprising a 3D object database.

S12. The system according to the preceding embodiment wherein the 3D object database is configured to store a plurality of generated 3D virtual objects.

S13. The system according to any of the preceding system embodiments wherein the processing component is further configured to detect an object of Interest in an arbitrary input image.

S14. The system according to any of the preceding system embodiments configured to carry out the method according to any of the preceding method embodiments.

Below is a list of neural network training embodiments. Those will be Indicated with a letter "N". Whenever such embodiments are referred to, this will be done by referring to "N" embodiments.

N1. A method for training a neural network to generate 3D objects based on a 2D image, the method comprising
  Creating a benchmark 3D object representing a physical object and comprising a plurality of 3D object parameters, said 3D parameters representing the benchmark 3D object's topology;
  Randomizing the plurality of 3D parameters within predetermined parameter ranges to generate a plurality of synthetic 3D objects representative of the physical object;
  For each synthetic 3D object, creating a 2D object image;
  For each 2D object Image, calculating a set of 2D object parameters;
  Storing the respective 2D object parameters and the plurality of 3D object parameters for each synthetic 3D object;
  Training a neural network based on the stored 2D object parameters and 3D object parameters pairs.

N2. The method according to the preceding embodiment further comprising
  Using the trained neural network to output 3D object parameters given an input of 2D object parameters.

N3. The method according to any of the two preceding embodiments wherein the benchmark 3D object comprises a morphable head model.

N4. The method according to the preceding embodiment wherein the 3D parameters comprise a plurality of blend shapes, said blend shapes representing a plurality of morphable facial regions.

N5. The method according to any of the four preceding embodiments further comprising
  For each synthetic 3D object, generating at least one face texture.

Below is a list of wolfcoder training embodiments. Those will be Indicated with a letter "L". Whenever such embodiments are referred to, this will be done by referring to "L" embodiments.

L1. A method for training a neural network to output 3D avatar parameters, the method comprising
  Generating a training dataset by
    Collecting a plurality of Images, each comprising a different human face;
    For each image, inputting 2D parameters describing the face depicted in it;
    For each Image, Inputting ground truth 3D parameters corresponding to the human face depicted in it;
    Storing the pairs of the 2D parameters and the corresponding ground truth 3D parameters together
  Inputting 2D parameters corresponding to each image into a neural network;
  The neural network outputting estimated 3D parameters based on the input 2D parameters;
  Comparing the estimated 3D parameters with the ground truth 3D parameters;
  Using the comparison to improve the neural network's subsequent output of the estimated 3D parameters.

L2. The method according to the preceding embodiment further comprising
  Generating the 2D parameters describing the face in the image by inputting the image into a facial recognition neural network.

L3. The method according to any of the preceding two embodiments further comprising
  Generating the 3D ground truth parameters by performing 3D scans of the human face depicted in each image.

L4. The method according to any of the three preceding embodiments wherein Improving the neural network's output is performed by a backpropagation process.

L5. The method according to any of the four preceding embodiments wherein the trained neural network is configured to carry out the method according to any of the preceding M embodiments.

Below is a list of method embodiments. Those will be Indicated with a letter "P". Whenever such embodiments are referred to, this will be done by referring to "P" embodiments.

P1. A method for generating a 3D object, the method comprising
  Generating a benchmark 3D object comprising a set of variable coefficients by using a dataset comprising a plurality of images comprising benchmark 2D objects of Interest; and
  Training a linear regression model to output optimized set of coefficients based at least on an input image with a 2D object of Interest; and
  Inputting a new image comprising a 2D object of Interest into the trained model; and
  Generating the 3D object corresponding to the 2D object of Interest by applying the optimized set of coefficients to the benchmark 3D object.

P2. The method according to the preceding embodiment wherein the 3D object comprises a 3D head model, the benchmark 3D object comprises a morphable 3D head model, and the 2D object of Interest comprises a face photograph.

P3. The method according to any of the two preceding embodiments wherein the method is performed by using principal component analysis (PCA) algorithm.

P4. The method according to any of the three preceding embodiments and with features of embodiment P2 wherein generating the benchmark 3D object comprises extracting facial recognition embedding from the benchmark face photographs.

P5. The method according to the preceding embodiment further comprising applying principal component analysis to the set of all extracted facial recognition embeddings.

P6. The method according to the preceding embodiment further comprising reducing dimensionality of resulting principal component basis.

P7. The method according to the preceding embodiment wherein the dimensionality is reduced by picking a predetermined number of first principal components.

P8. The method according to any of the two preceding embodiments further comprising constructing the benchmark 3D object by using the retained principal components.

P9. The method according to any of the eight preceding embodiments and with features of embodiment P2 wherein training the linear regression model comprises Inputting facial recognition embeddings corresponding to benchmark face photographs.

P10. The method according to the preceding embodiment wherein training further comprises converting the facial recognition embeddings into principal component basis and outputting coefficients corresponding to 3D head models of the input 2D face photographs.

P11. The method according to the preceding embodiment wherein training further comprises optimizing difference between the output coefficients and actual coefficients corresponding to the benchmark 2D face photographs.

P12. The method according to any of the eleven preceding embodiments and with features of embodiment P2 wherein Inputting a new image comprising a 2D face further comprises extracting facial recognition embedding of the face of the input new image.

P13. The method according to any of the twelve preceding embodiments and with features of embodiment P2 wherein generating the 3D head model corresponding to the new input images further comprises using the coefficients output by the trained model to generate the new 3D head model.

P14. The method according to any of the thirteen preceding embodiments further comprising generating a texture corresponding to the 2D object of Interest of the new image.

The present technology will now be discussed with reference to the accompanying drawings.

BRIEF DESCRIPTION OF THE DRAWINGS

FIG. 12 schematically Illustrates another embodiment of a method for generating a 3D object.

DESCRIPTION OF EMBODIMENTS

Figure 1:
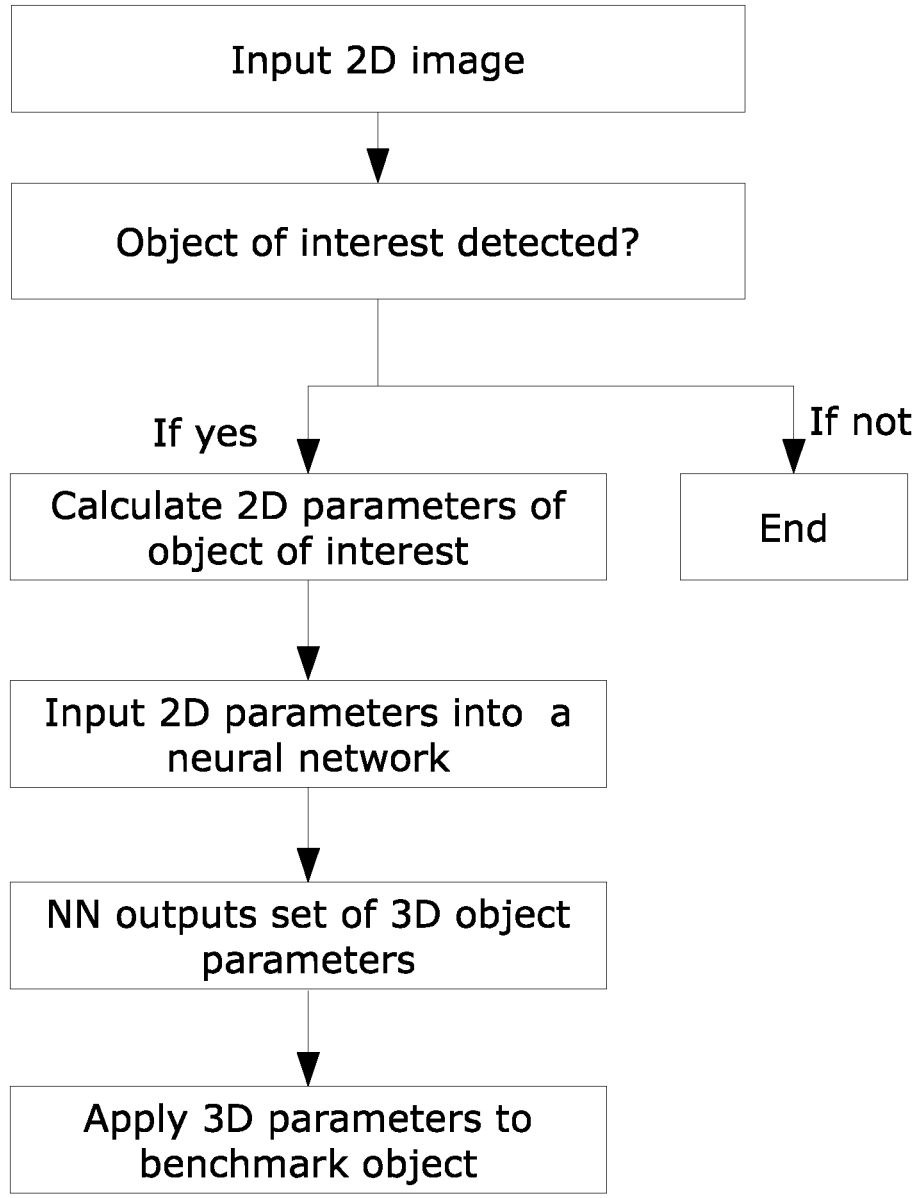
FIG. 1 depicts an embodiment of a method for generating 3D objects from 2D Images.

FIG. 1 schematically depicts an embodiment of a method for generating 3D objects from 2D Images. In a first step, a 2D image is input. The input may be done through a user Interface and/or via a user-operated device. For example, the user may take a picture of their face on their smartphone or a similar personal computing device, which then may be input via an app. The input may be received by a processing component, which may comprise a server, a distributed computing network, a collection of servers or the like.

In a second step, the 2D image is processed to verify whether an object of Interest is detected. For example, the object of Interest may comprise a human face. Such a scan may comprise a standard way of detecting faces in Images.

If the object of Interest has been detected in the 2D image, the next step comprises calculating 2D parameters of the object of Interest. Such parameters may characterize the object of Interest and uniquely determine its geometry. For example, 2D parameters may comprise facial recognition embedding.

In the next step, the 2D parameters are input into a neural network. The neural network can comprise, for example, a convolutional neural network that has been pre-trained on a set of relevant data. Such data may comprise, for example, a set of synthetically generated human head avatars together with a set of 2D images obtained from such avatars.

The neural network then outputs a set of 3D object parameters based on the input 2D parameters. The 3D object parameters may comprise, for example, blend shapes that represent the topology of various regions of a human head avatar.

In the next step, the output 3D object parameters are applied to a benchmark object to obtain a specific 3D object corresponding to the object of Interest detected in the 2D Image. In other words, the benchmark object is transformed or morphed based on the specific 3D object parameters obtained via the neural network. The benchmark object may comprise, for example, a generic morphable human head model. Such an object may have a plurality of variable blend shapes determining the overall topology of the head model, and thereby enabling it to look like different people.

The generated 3D object (which may comprise a human head avatar) can then be output onto a graphical Interface and/or stored for future use (for example, the avatar can be stored in an avatar database).

Figure 2:
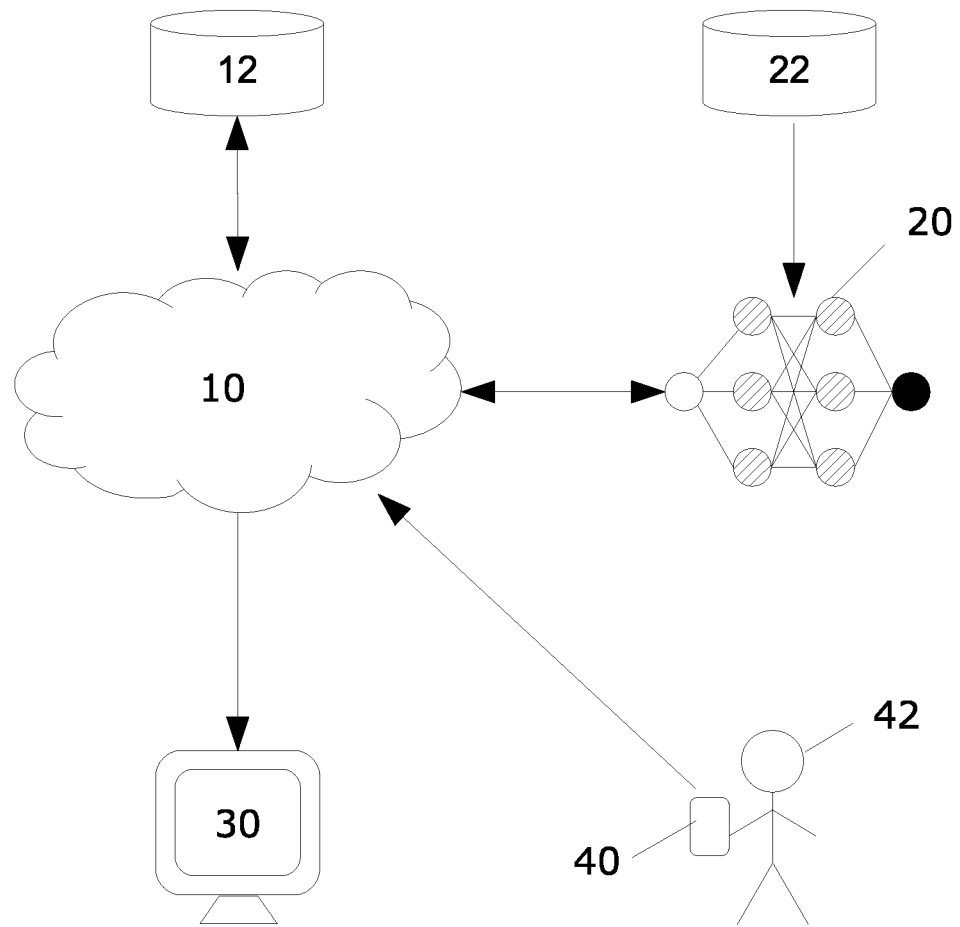
FIG. 2 depicts a schematic embodiment of a system for generating 3D objects from 2D Images.

FIG. 2 depicts a system configured to generate 3D virtual objects from 2D Images. The system comprises a processing component 10, which may comprise a server, a cloud server, a distributed computing resource or the like. The processing component 10 can generally coordinate the system's operations.

The processing component 10 may be in communication with a neural network 20. Additionally or alternatively, the neural network 20 can be a part of the processing component 10, so that it is run as a subprocess directly on the processing component 10. The neural network 20 can be trained on a set of data stored in a training database 22. Such data may comprise 3D parameters and 2D parameters of synthetically generated 3D objects. In a specific example, the 3D parameters may comprise blend shapes and 2D parameters may comprise facial recognition embedding, with 3D objects corresponding to synthetically generated avatars of human heads. The training database 22 may also store a benchmark 3D object which can be used as a "canvas" for each specific set of 3D object parameters. In a specific example, the benchmark 3D object may correspond to a morphable human head model.

The processing component 10 may also be able to access and modify a 3D object database 12. This database may comprise 3D objects generated from the 2D images via the pre-trained neural network 20. For example, the 3D object database 12 may be used to store and retrieve a plurality of avatars of human heads.

The processing component 10 may also be in communication with/controlling a graphical Interface 30. The graphical Interface 30 may comprise a virtual environment such as a virtual meeting room, classroom or the like. The generated 3D objects may then be used within such a virtual environment. In other words, the generated 3D objects may be output on the graphical Interface 30.

The system may further comprise an input component 40. The input component 40 may comprise a user-operated device, such as a personal computing device (e.g. smartphone, tablet, laptop, or the like). The input component 40 may be used to generate the 2D Image that can be input to the processing component 10 and processed to obtain a 3D virtual object.

For example, a user 42 may take an Image of their face with their computing device 40, input it to the processing component 10 (e.g. via a user Interface such as an app), and receive a 3D avatar via the graphical Interface 30. Note, that the graphical Interface 30 may also correspond to the user's personal computing device, so that the 3D virtual object may be output directly onto the user's device serving as the input component 40. However, the graphical Interface 30 may also comprise a separate device and/or can be output onto a plurality of devices simultaneously, such as in the case of a virtual meeting being conducted via the graphical Interface 30.

Figure 3A:
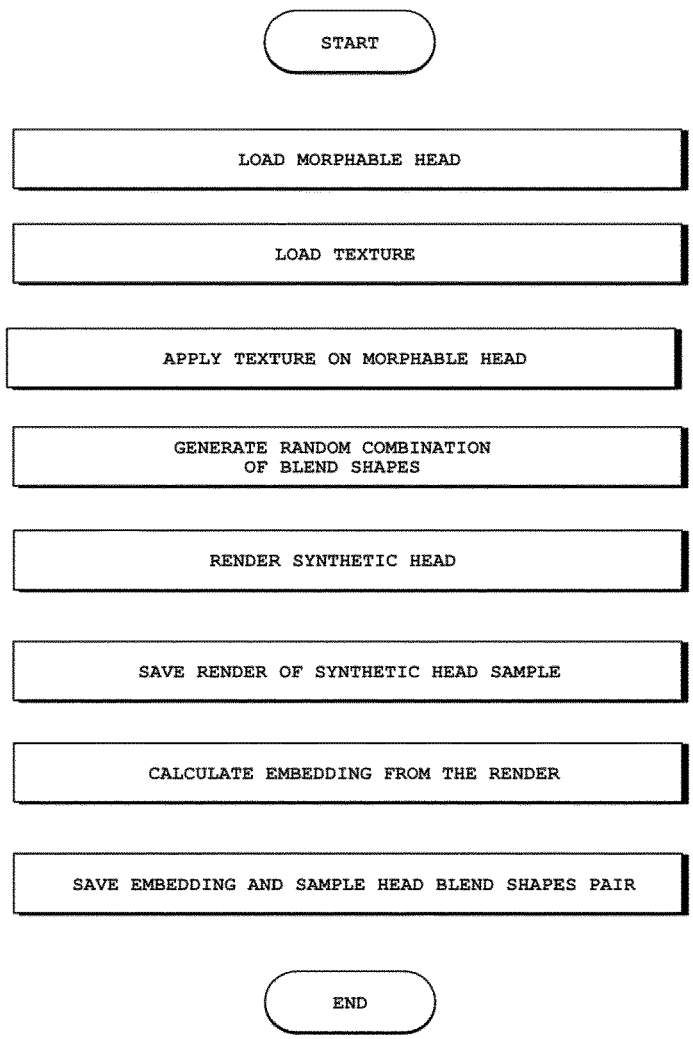
FIGS. 3a and 3b depict a specific exemplary embodiment of the method directed towards generating a training dataset and training a neural network for the purposes of generating 3D head avatars from images of people.
Figure 3B:
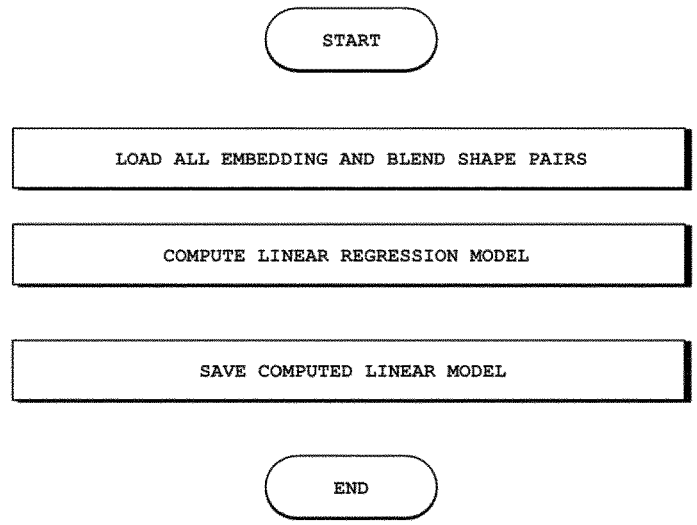

FIGS. 3a and 3b depict a specific exemplary embodiment of the method directed towards generating a training dataset and training a neural network for the purposes of generating 3D head avatars from Images of people.

Generation of a dataset and machine learning model

Generation of a dataset and machine learning model for avatar generation can be described in the following steps.

Creating a morphable head model with N amount of facial blend shapes that affect local subregions of a face Texturing morphable head with one or more textures of human faces Randomizing the applied texture and combination of blend shapes used to create synthetic head examples that are human-like in their appearance.

Saving a rasterized render of a synthetic head sample

Calculating a facial recognition embedding from the render

Storing the pair of facial recognition embedding calculated from the render and the blend shapes used when generating the render as one sample into the training data Calculating linear regression function that given an input facial recognition embedding provides output blend shapes describing the facial shape In order to generate avatars from a single photograph a machine learning model must be created that can be used to estimate the shape of any face. One of the key components in avatar creation and stylization is a morphable 3D model of a human head. Morphable model represents a linear combination of 3D geometry capable of representing a large number of different facial shapes. We have created a 3D morphable model with a large number of facial blend shapes—shapes which are derived and deformed from the canonical present head shape. Each blend shape affects a local subregion of the canonical basehead (a head model) and can be applied in combination with any other blend shape. Blend shapes describe how different areas of the head model can be morphed, for example the developed morphable head model Includes blend shapes such as nose_wide, eyes_large, mouth_upper_lip_narrow.

In order to create a machine learning model capable of predicting the shape of any face from an input photograph, large number of training data is required. We've created a novel approach for creating the required dataset by synthesizing a large number of facial shapes and storing their blend shape representation during the synthezation process.

As shown in FIG. 3a, dataset generation begins by loading a pre-made morphable head model consisting of a large number of different facial shapes that modify the shape of a particular facial subregion. During the dataset generation a pre-made head texture is loaded and applied onto the morphable head model. Morphable model blend shapes are Initialized with randomized values in specific ranges. The resulting textured synthetic head mesh is rendered—a 2D image from the 3D scene is generated and stored.

In order to create a dataset sample, facial recognition embedding is calculated from the previously rendered sample of a synthetic head. The calculated facial recognition embedding and sample head blend shapes pair is stored as one sample in the dataset.

Morphable model blend shapes initialization, rendering and storing of a facial recognition embedding is executed N times.

As depicted in FIG. 3b, in order to generate a machine learning model capable of predicting facial shape information all stored embedding and blend shape pairs are loaded. Machine learning model is created by detecting linear correlations between embedding input and blend shape output. Finally computed linear model is stored. Result is a trained linear regression function that given an input facial recognition embedding predicts output blend shape data.

Figure 4:
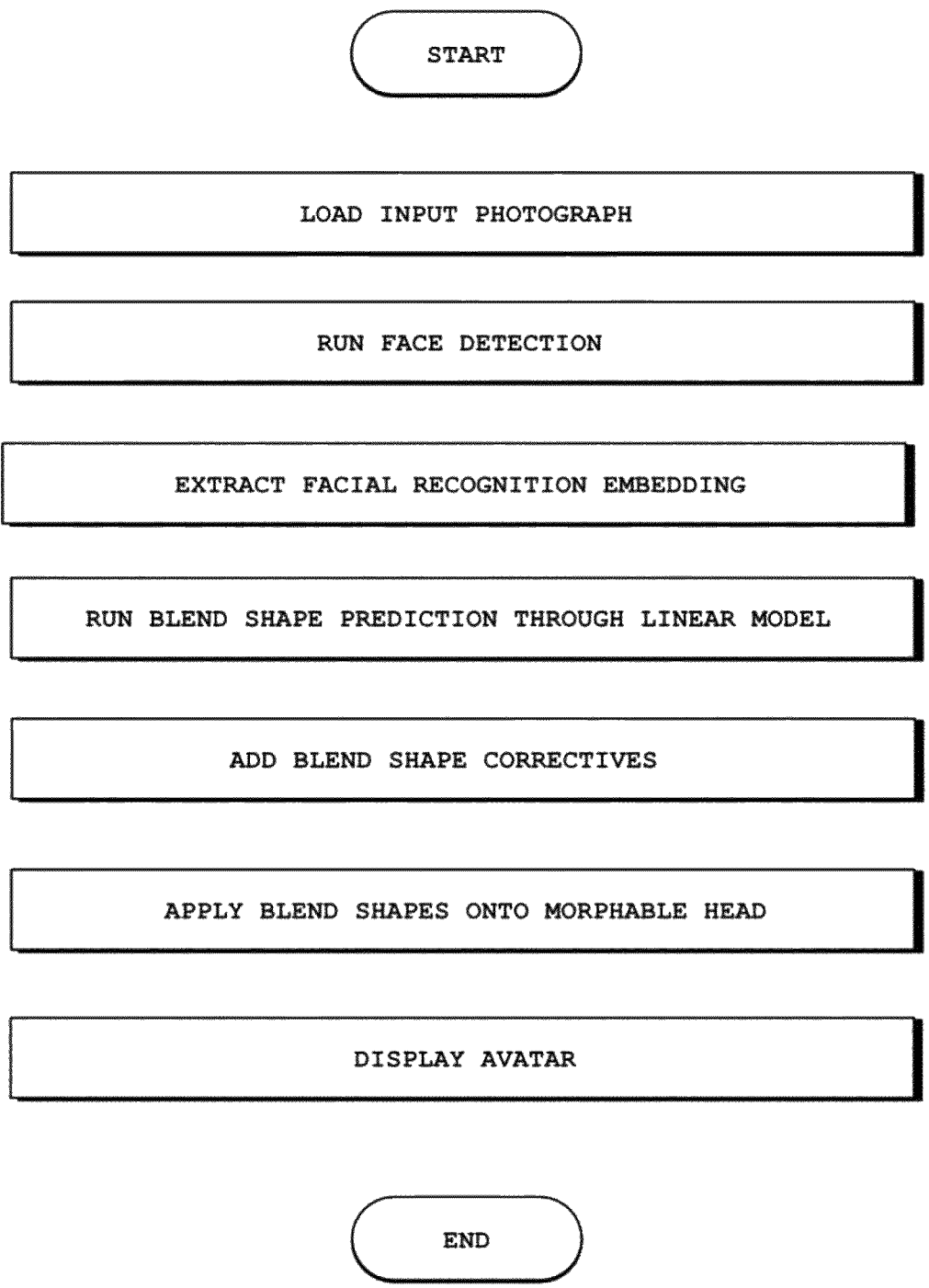
FIG. 4 depicts a specific exemplary embodiment of the method directed towards Inputting images (photographs) and outputting 3D avatars of human heads.

FIG. 4 depicts a specific exemplary embodiment of the method directed towards Inputting images (photographs) and outputting 3D avatars of human heads.

Prediction of Head Mesh

Steps for predicting facial shape Information for any photograph Including a face can be described as follows.

Given an input photograph/image, face detection is run to validate the existence of a face in the image (this step can be optional if it is already known that a photograph has a face in it, but can be used, for example, to Invalidate photographs that do not have faces in them).

If the input photograph Includes a face, calculate facial recognition embedding for one or more faces visible in the image Input the calculated facial recognition embedding into the trained linear model to receive estimated facial blend shapes as output Apply the estimated output blend shapes calculated from the linear regression function onto an existing head model In order to estimate facial shape from any photograph first the described system checks whether the input photograph Includes a face or not. For that face detection is run in order to validate the existence of a face in the image. If one or more faces are found in the photograph the described system calculates a facial recognition embedding for the one or more faces visible in the photograph.

The calculated facial recognition embedding is then used as a variable in the trained linear model in order to receive estimated output of facial shape blend shapes.

The estimated facial blend shapes from the linear model are applied onto an existing canonical morphable 3D head model which has corresponding blend shapes in order to deform the mesh component.

Textures can also be extracted from the image (not depicted in FIG. 4).

Creation of Head Texture

The texture component describes the surface color Information of the avatar—the subject's facial area on the input photograph mapped onto a visual representation of the mesh component flattened onto a two-dimensional plane. This is further Illustrated with reference to FIG. 7.

Figure 5:
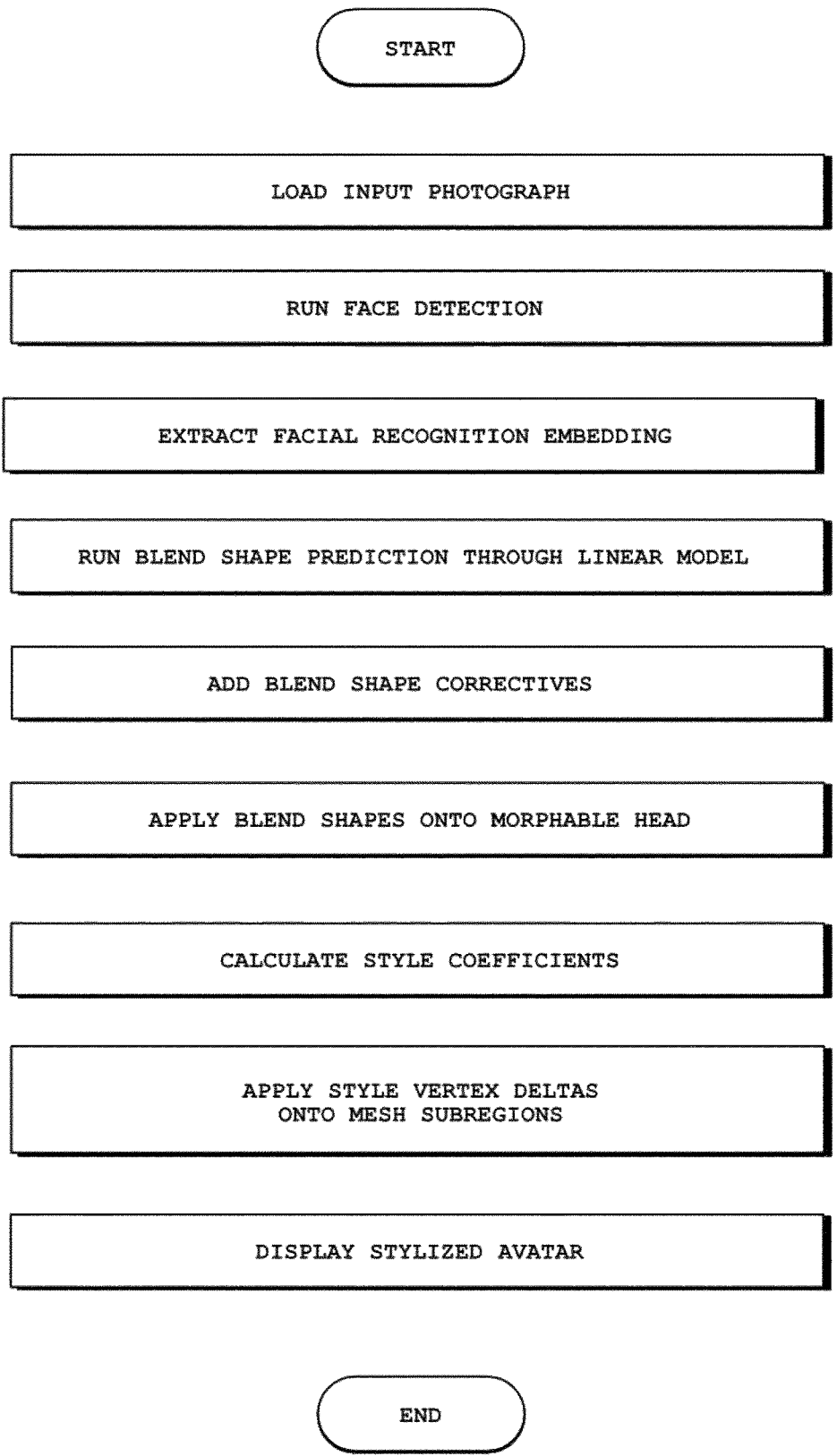
FIG. 5 shows a specific exemplary embodiment directed towards further styling the generated avatars of human heads.

FIG. 5 depicts a specific exemplary embodiment directed towards further styling the generated avatars of human heads. Following the procedure shown in FIG. 4, the resulting avatar can be styled with a particular style.

Stylization of Head Mesh
    Canonical gender and ethnicity neutral basehead (that is, the morphable head model) can be used
    After output blend shapes from the linear regression has been applied to the basehead, a style blend shape is applied
    Style blendshape is described as a pre-set collection of vertex translation deltas that affect a local subregion of the head mesh
    Dependent on the output blend shapes of the linear regression a decision is made how much each subregion of the style should affect the final stylization result. For example, this can result in skinny looking faces also resulting in skinny looking stylized faces
    Stylization of mesh Including any subregion modifications is applied as vertex deltas on top of the original predicted results received from the linear regression function. This means that the outputted stylized avatar has the facial features of the original predicted result but affected by the mesh stylization process.

In order to stylize the mesh component of 3D avatars two stylization methods are explained.

Simple Mesh Stylization

Simple mesh stylization works by applying a premade style blend shape on a resulting 3D avatar. The style blend shape can be described as a linear modification of certain avatar vertices by translating selected vertices of an avatar from their original 3D positions to new 3D positions. The Influence of the style applied is Invariant to the generated non-stylized face shape. Simple mesh stylization is useful when very stylized aesthetic look is desired and if great control over the specific artistic outcome is needed. As no information prior to the stylization process is taken into account resulting stylized avatars may lack recognizability as original facial features may have been heavily reduced.

Subject-Specific Mesh Stylization

Second mesh component stylization method takes one or more of the avatar features into account when mesh stylization is applied. The features that affect how mesh stylization is applied are but not limited to gender, ethnicity and predicted non-stylized shape Information.

We have created a mesh stylization system which introduces stylization blend shapes that are specific or dependent on a combination of gender, ethnicity and predicted non-stylized face shape. For example, Instead of applying mesh subregion vertex modifications with the same Influence for all avatars, avatar is stylized by first automatically selecting the correct aesthetically suitable style blend shape based on various specific characteristics such as particular shape of a facial feature, gender, and/or ethnicity of the subject. Furthermore, the original non-stylized facial shape blend shapes are analyzed to alter the Influence of the suitable style blend shape or to Introduce additional style blend shapes. With this system, the same aesthetic style can be automatically configured to match the subject's gender, ethnicity and non-stylized facial shape features.

Figure 6:
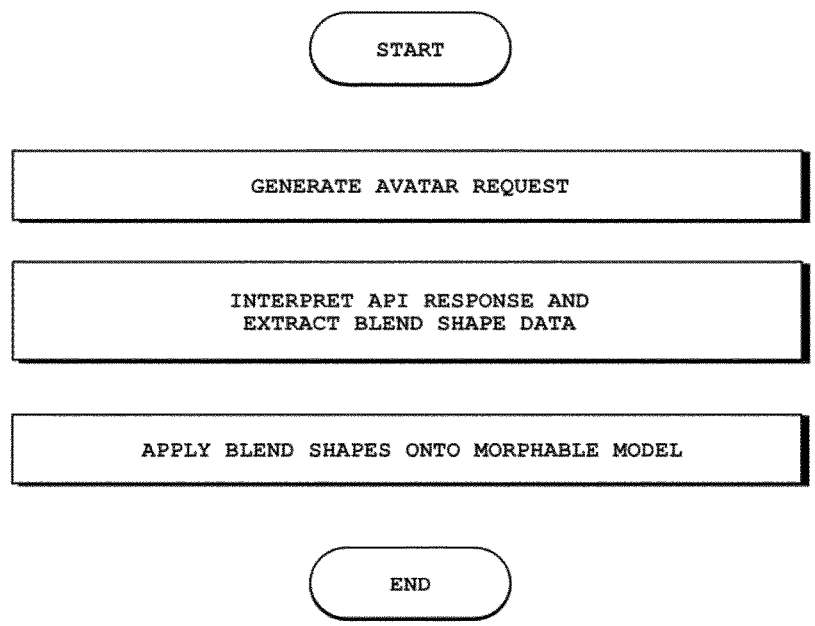
FIG. 6 is directed towards using the present method as part of a user Interface.

FIG. 6 is directed towards a high level architectural overview of using the present method. The avatar request can be generated via an input component (such as a user-operated device, e.g. a smartphone) directly by the user (by transmitting a 2D photograph of their face). The photograph can then be analyzed and processed, and an avatar output. An avatar creation request can be submitted from a user device into an API either by making http requests to remote servers and receiving the response or by Interfacing with the API embedded on-device through an SDK.

In a first step, the user device can create an avatar generation request and submit it into an API (either a via an on-device SDK or a via a remote server).

In a second step, the photograph can be processed (similarly either via on-device SDK or via a remote server).

In a third step, processed data comprising generated avatar output can be received from a local SDK and/or from a remote server.

Figure 7:
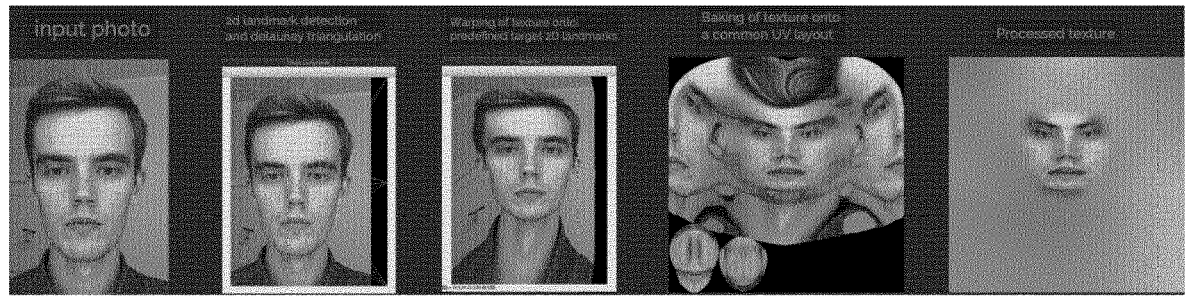
FIG. 7 depicts an exemplary embodiment of generating a face texture component.
Figure 8:
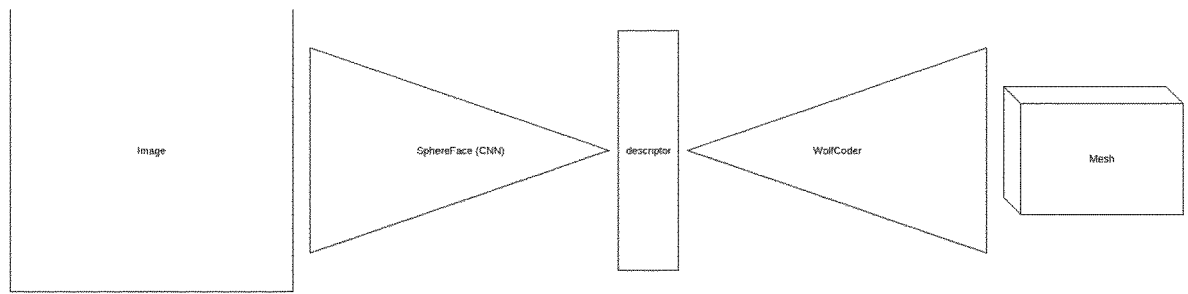
FIGS. 8 to 11 depict an embodiment of an alternative method for generation of 3D head mesh based on a 3D scan database.
Figure 9:
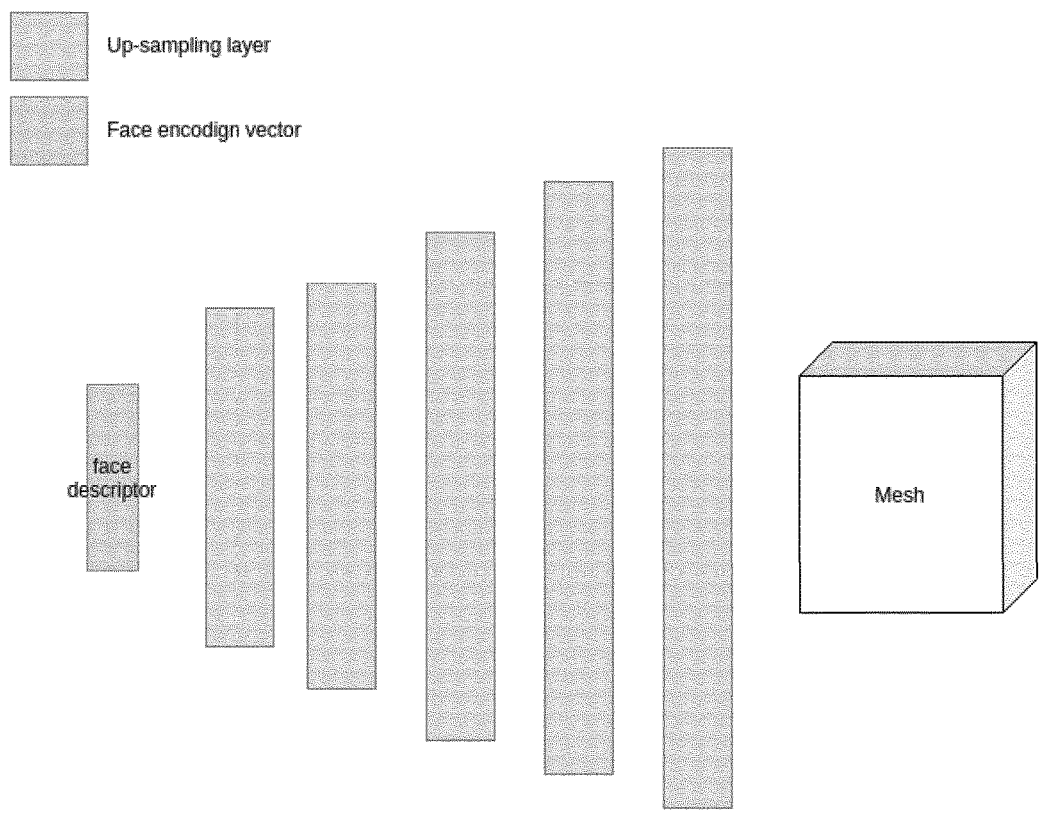
Figure 10:
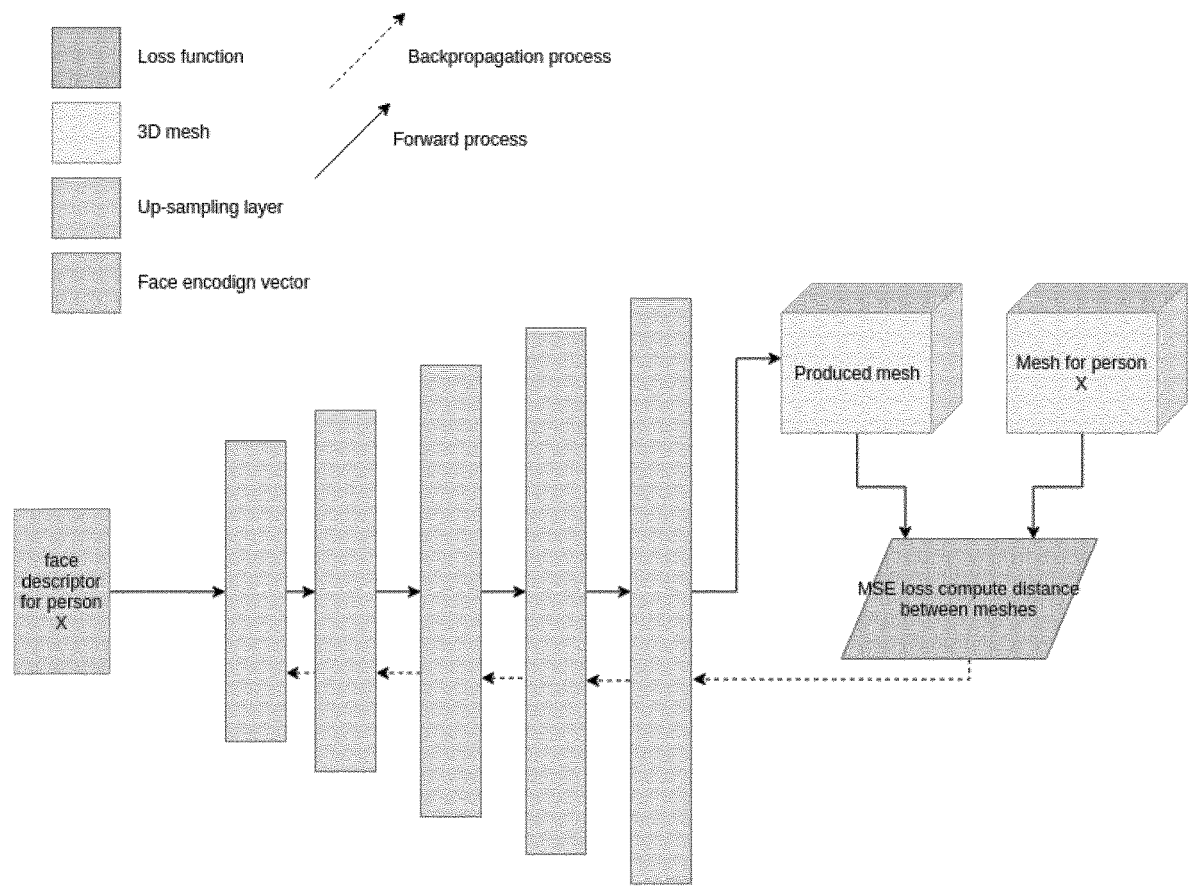

FIG. 7 shows an exemplary embodiment depicting generation of a texture component of a 3D avatar. The first (leftmost) sketch shows a photograph that can be input into the system. The photograph may have been taken via a user device such as a smartphone prior to Inputting it. The second sketch shows detection of 2D landmarks on the photographs. The third sketch shows warping of the textures onto predefined 2D landmarks. The fourth sketch Illustrates baking of the texture onto a UV layout. The final sketch shows the processed texture. The steps are further discussed below.

Creation of a head texture can be described with the following steps:
    Detection of 2D landmarks on an Image or a photograph
    Warping of texture onto predefined target 2D landmarks
    Baking of texture onto a common UV layout
    Texture post processing
        Texture cleanup
        Texture enhancements
        Exposure correction
        Shadow and highlight smoothing
        Automatic white balance based on eye sclera
    Texture stylization (optional)

While not all of the above steps are required for texture generation, the best quality may be obtained by Implementing all of them. Some steps may be omitted to reduce computing power and/or time needed to generate the texture component.

In order to create a 2D texture for an avatar first a set of 2D landmarks must be located on the input photograph. These 2D landmarks specify areas of a face such as eye corners, mouth corners, tip of nose among others. Those 2D landmarks are stored as two-dimensional vectors describing the pixel coordinates on the Image. The 2D landmarks are triangulated using Delaunay triangulation and resulting 2D triangles are transformed to a predefined set of 2D points using affine transformation—a transformation during which points, straight lines and planes during the 2D transformation are preserved. After affine transformation the transformed facial image is projected onto a canonical 3D base head which has predefined set of UVs. Coordinates of the projected image onto the 3D base head are stored resulting in an unprocessed texture map of the subject that can be mapped onto the canonical 3D base head representing its surface color Information.

A series of texture processing steps are used to create a fully featured 2D texture map usable in virtual environments. First during a texture cleanup process a set of inpainting masks are used to reconstruct lost and deteriorated parts of the original texture map. This includes but is not limited to inpainting regions of lips, eyes and nose. During the inpainting process areas of the texture map that are often lower quality due to Inaccuracies in 2D landmark detection or undesired lighting or shadowing are Improved by filling them by sampling surrounding pixel Information on the existing texture. During texture enhancement process a set of overlay textures are Introduced to fill in areas that are not visible in the image such as neck, back of the head or ears. Skin tone is estimated from the photograph and tonality of the overlay textures is compensated accordingly. A series of shadow and highlight smoothing steps are executed on the texture to result in an evenly lit texture without texture artifacts. Automatic white balance compensation is performed based on extracted eye sclera color detected in the image. Optionally texture is stylized by adjusting the parameters of gaussian blur function and bilateral filters to achieve desired texture style.

FIGS. 8 to 11 depict an embodiment of an alternative method for generation of 3D head mesh based on a 3D scan database. This can be achieved by using neural network decoder transforming a high dimensional face descriptor into mesh through convolutional layers. The difference compared to the previously described method is that a more detailed database comprising 3D scans of people's faces along with their photographs is needed for training the WolfCoder (whereas in the previously described approach, the training database may be advantageously generated synthetically, which can be quicker and simpler than collecting 3D scans of people's faces). After it has been trained, the WolfCoder can take as an input a face descriptor and output a face mesh (corresponding to 3D parameters that can be used to generate the avatar). The face descriptor can be generated (based on an input image) by a conventional neural network that is generally used for facial recognition. The present approach may yield even better quality avatars than the previously described one, but requires a more sophisticated training set. Therefore, it can be used for applications where more precision is desired with the caveat that training may be more involved.

One further difference with respect to the previously described approach is that the output of WolfCoder can comprise a 3D mesh (virtual object) that is represented by coordinates in 3D space (x,y,z). The difference here is that while the previously described approach outputs 3D object parameters (blend shapes), WolfCoder outputs XYZ coordinates of vertices of a 3D mesh. In a specific example, in the previously described approach part of the output can comprise blend shapes, such as
nose_wide: 0.7
eyes_large: 0.2
. . .

Then, in case of WolfCoder, the output would be similar to
v1 0.32 0.11 −0.49
v2 0.04 −0.28 −0.65
v3 −0.15 −0.21 −0.65
. . .

Where v means "vertex" and the 3 floating point values represent the coordinates in 3D space. The full 3D head mesh could consist of thousands of these points.

However, this output of WolfCoder comprising the coordinates can be converted this output into blend shape representation as an additional step after output from the neural network has been received.

In this way, the present approach can be used within the previously described framework after the output has been received (in other words, any stylisation and post-processing of a generated avatar can be done in the same way for the previously described approach, as well as for the WolfCoder approach).

The present approach, referred to as WolfCoder, can be based on neural network for reconstruction of a face mesh from a face recognition encoding acquired from an input photograph. Neural network can be based, for example, on mesh convolution layers that were proposed in work "Generating 3D faces using Convolutional Mesh Autoencoders" (CoMA).

Unlike CoMA, WolfCoder can comprise only up-sampling layers (that is, no down-sampling layers are used) and is trained supervised on a prepared 3D scan dataset.

The output of the neural network is a 3D mesh (virtual object) that is represented by coordinates in 3D space (x,y,z). The 3D mesh represents the facial geometry of the user who appears in the input photograph.

Face descriptor is a face vector representation made with a face-recognition neural network. The face descriptor used for WolfCoder can comprise a 512 dimensional 1D vector (512 floating point numbers). The face descriptor however can comprise less or more dimensions.

The database used for training WolfCoder can comprise a pair of a face photograph of a person and their ground truth 3D mesh—an accurate 3D representation of the user acquired through photogrammetry, 3D depth scanning technology or similar. The ground truth mesh is represented as coordinates in 3D space (x,y,z).

Prior to training WolfCoder neural network, face-descriptor was created by a face-recognition neural network for every photograph in the training dataset. The training dataset used for training WolfCoder comprises pairs of face-descriptor and their corresponding 3D ground truth mesh.

WolfCoder can be trained with a backpropagation algorithm. Face-descriptor from the dataset is used as an input of the neural network. WolfCoder produces a 3D mesh, which then is compared to the ground truth mesh from the dataset to calculate a loss function. MSELoss is used as loss function.

Figure 11:
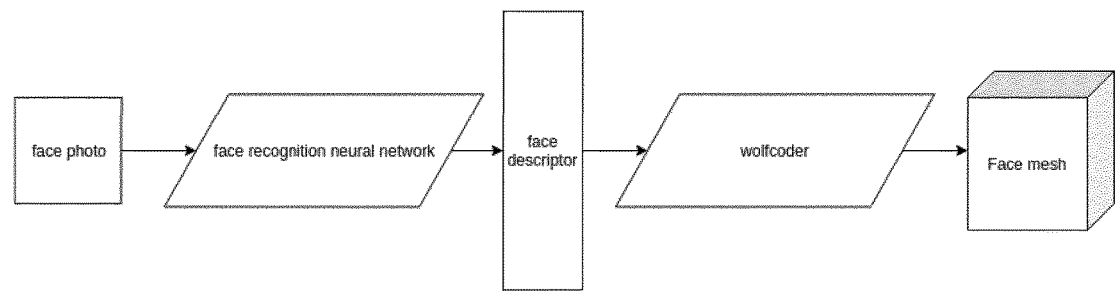

The high-level process of using WolfCoder for any new face mesh creation can be described as in the following (illustrated in FIG. 11).

1. Using a face-recognition neural network to create face-descriptor from face photo
2. Make 3D mesh from produced face descriptor using WolfCoder FIG. 12 schematically depicts another embodiment of a method for generating a 3D object. The general steps of the method are steps S1 to S4. Step S5 is optional. The dashed-line boxes on the side of each of the steps S1 to S4 serve to provide one exemplary specific Implementation of the present method.

Preferably, the present method can be used to generate 3D head models or avatars based on images or photographs of human faces. The present method differs from those previous discussed in that it allows to change the concept of blendshapes, which generally correspond to a certain physical characteristic of a face (e.g. nose=wide) into the principal components. The principal components are generated based on a plurality of facial recognition embeddings from a benchmark face photographs dataset. The principal components may not correspond directly to an Isolated physical characteristic (such as nose shape, lips wideness etc.), but rather correspond to Interrelated changes of various facial components. For example, one principal component may correspond to a general visual difference between a more female-presenting face and a more male-presenting face. The principal components form an orthogonal basis, and are therefore all linearly Independent from each other. Furthermore, they are ordered in a way that the first principal components correspond to the largest or most obvious facial differences. This allows to discard the "tall end" of the principal components without any significant reduction in quality of the resulting 3D head model. In order to generate avatars from a single photograph, a machine learning model must be created that can be used to estimate the shape of any face. Creating this model can be done e.g. as follows:

1. Generate a morphable head model based on face-recognition technology
2. Train a linear regression head shape prediction model This morphable head model and linear regression model can then be used to predict the 3D geometry of the face from an arbitrary facial photo.

In S1, a morphable 3D head model is generated by using a dataset of benchmark face photographs.

This can be exemplarily performed by extracting facial recognition embedding from each benchmark face; performing principle component analysis on the embeddings, and reducing dimensionality and constructing a morphable 3D head model by using the retained (from the dimensionality reduction) principle components.

The morphable model can comprise a number of 3D geometries, a linear combination of which is capable of representing a large number of different facial shapes.

To build this model, PCA-based dimensionality reduction can be used on the dataset of 3D scans. Each of the output principal components is a 3D mesh obtained by a linear combination of all scans in the dataset. As a result, any facial shape which could be represented as a linear combination of all scans in the dataset, can also be very closely represented as a linear combination of a much lower number of principal components.

Unlike many existing morphable model-generation approaches, this method allows for extraction of facial recognition embedding from frontal facial image for every sample in the dataset, and then using it as an input for PCA. This facial recognition representation is a multidimensional vector extracted from a facial photo in such a way that it is robust to changes in pose and light. Because the deep learning model that extracts it is trained on a large benchmark dataset, it contains many non-obvious statistical relations between different features of the human face. As a result, output principal components in the morphable model are ordered by recognizability of the facial features they represent (e.g. one of the first components is changing the balance between Asian/Caucasian features, the other one affects masculine/feminine look).

Below follow exemplary detailed steps of morphable model generation:

1. Extract facial recognition embedding from frontal facial photo for each of the N samples in the dataset—this produces N×M matrix, where M is the size of facial recognition embedding vector.
2. Perform PCA and dimensionality reduction:
   a. Calculate covariance matrix from the input facial recognition embedding matrix.
   b. Extract eigenvectors and eigenvalues from the above covariance matrix.
   c. Sort eigenvectors by their corresponding eigenvalues.
   d. Pick the subset of first K eigenvectors (K≤N)—this is the PCA-basis matrix that will be used to construct morphable model meshes and convert samples in the dataset into morphable model representation.
3. Construct morphable model
   a. Calculate average mesh in the dataset (by averaging coordinates for each vertex across all samples).
   b. Calculate vertex coordinates deltas for each sample in the dataset (by subtracting average mesh from it).
   c. Calculate each component mesh as a sum of average mesh and samples deltas weighted by the corresponding eigenvector from the PCA-basis matrix.

In S2, a linear regression model is trained to output coefficients for the morphable head model.

This can be performed by Inputting facial recognition embedding of benchmark faces; converting the facial recognition embeddings into principal component basis and thereby obtaining the 3D head model coefficients corresponding to the benchmark faces; and training the linear regression model by comparing output coefficients and actual known coefficients and minimizing the difference between them.

By definition of the principal component analysis, these principal components are linearly-Independent and ordered by their correlation with facial recognition embedding, which means they can be predicted with the linear regression model, and the more Important the component, the better it could be predicted.

The linear regression model uses the facial recognition embedding vector as an input and outputs coefficients for our morphable model. The steps to train it can be e.g. as follows:

1. Convert the dataset of scans to the morphable model representation
   a. Represent each of N samples in the dataset in one-hot encoding N-dimensional vector. So that the matrix of such vectors forms the Identity-matrix.
   b. Perform the matrix multiplication of this Identity-matrix by PCA-basis matrix. Each row of the resulting matrix represents morphable model coefficients of the corresponding scan in the dataset.
2. Train linear model by minimizing the error between predicted and dataset output.

In S3, a new face photograph is input into the trained model.

This can be performed by extracting the facial recognition embedding from the new input face; and Inputting the facial recognition embedding into the trained linear regression model.

In S4, a 3D head model corresponding to the new face photograph is generated by applying the coefficients output by the trained linear model to the morphable 3D head model.

This can be done by using the coefficients output by the trained linear regression model to generate the new 3D head model.

The steps to get predicted face shape can be as follows:
1. Extract facial recognition embedding from the input photo.
2. Run it through the linear regression model to obtain morphable head components' coefficients.
3. Calculate the linear combination of the morphable model mesh components weighted by predicted coefficients.

In optional S5, texture for the 3D head model is generated.

This approach of building facial-recognition based morphable model can be also used on a texture space to generate skin textures that are robust to various factors in input photo: light, pose, expression, different objects covering small part of the face (e.g. glasses).

Steps to create the texture generation model can be as follows:
1. Generate a dataset of textures from high quality facial photos.
2. Create component textures using PCA with facial-recognition.
3. Train a linear regression model to predict PCA texture component weights from facial-recognition embedding.

These component textures and linear regression model can then be used to generate the final skin texture from the arbitrary facial photo.

Generating the texture dataset can be performed as described above (with reference to mesh stylization and description related to FIG. 7). The set of input photos should preferably have correct white balance and exposure, neutral face, no glasses, no hair covering the face.

Creating component textures is similar to the morphable head model generation described above, but uses pixel values Instead of vertex coordinates.

As an exemplary Implementation, below follow the detailed steps of morphable model generation:
1. Extract facial recognition embedding from a frontal facial photo for each of the N samples in the dataset.
2. Perform PCA and dimensionality reduction.
3. Construct texture PCA components
   a. Calculate average texture in the dataset (by averaging values for each channel of each pixel across all samples).
   b. Calculate texture deltas for each sample in the dataset (by subtracting average texture from it per-pixel).
   c. Calculate each component texture as a per-pixel sum of average texture and samples deltas weighted by the corresponding eigenvector from the PCA-basis matrix.

Training of the linear regression prediction model for the texture dataset can be Implemented similarly to the training for the facial shape as described above.

When a new photograph with a face in it is input, the steps to obtain the texture for a 3D head model can be as follows:
1. Extract facial recognition embedding from the input photo.
2. Run it through the linear regression model to obtain texture components' coefficients.
3. Generate the texture as a per-pixel sum of average texture from the dataset and component textures weighted by predicted coefficients.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) Is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for generating a 3D avatar, the method comprising
   inputting a 2D image comprising an object of interest comprising a face;
   calculating a set of 2D parameters of the object of interest;
   inputting the set of 2D parameters into a trained neural network;
   the neural network outputting an estimated set of 3D avatar parameters, said parameters representing deviations with respect to 3D parameters of a benchmark 3D head model;
   applying the set of 3D avatar parameters to the benchmark 3D head model to obtain the 3D avatar; and
   prior to inputting the 2D parameters into the trained neural network, training the neural network to output 3D avatar parameters given an input of 2D parameters, wherein the training comprises:
      randomizing the plurality of 3D parameters of the benchmark 3D head model within predetermined parameter ranges to generate a plurality of synthetic 3D avatars representative of human heads;
      for each synthetic 3D avatar, creating a corresponding 2D object image; and
      training the neural network based on the synthetic 3D avatars and their corresponding 2D object images.

2. The method according to claim 1, wherein the 2D image comprises a photo taken by a camera and wherein the method further comprises, prior to all the other steps, the step of capturing the photo and wherein the photo is captured via a user-operated terminal.

3. The method according to claim 1, further comprising displaying the 3D avatar via a graphical interface and using the generated 3D avatar within a virtual interaction environment.

4. The method according to claim 1, further comprising applying a stylization to the generated 3D avatar and wherein applying a stylization comprises applying a transformation to at least a subset of the set of 3D avatar parameters.

5. The method according to claim 4, wherein the stylization comprises a transformation of the generated avatar into a preselected digital style and wherein the stylization does not affect general facial features of the generated avatar.

6. The method according to claim 1, further comprising texturing the 3D virtual object and wherein texturing comprises
   detecting 2D landmarks and a plurality of textures on the 2D image;
   transforming the detected 2D landmarks into predefined target 2D landmarks;
   warping the detected textures onto the predefined target 2D landmarks;
   baking the warped texture onto a predetermined layout;
   applying the baked texture to the 3D virtual object.

7. The method according to claim 5, further comprising processing the detected textures and wherein processing comprises at least one of
- cleaning up textures;
- enhancing textures;
- correcting texture exposure;
- smoothing texture shadows and highlighting.

8. The method according to claim 1, wherein detecting an object of interest comprises
- running a face detection algorithm on the 2D image and detecting at least one face and wherein calculating a set of 2D parameters comprises calculating a facial recognition embedding for the face detected in the 2D image.

9. The method according to claim 1, wherein the 3D parameters of the benchmark 3D head model comprise facial blend shapes comprising a vertex in a multidimensional vector space.

10. The method according to claim 1, wherein the benchmark 3D head model comprises a morphable head model and wherein the morphable head model comprises a linear combination of variable vertices configured to represent a plurality of different facial shapes.

11. The method according to claim 1,
wherein training of the neural network comprises creating the benchmark 3D head model representing a human head and comprising a plurality of 3D parameters, said 3D parameters representing the benchmark 3D head model's topology.

12. The method according to claim 1,
wherein the 2D object image of at least one synthetic 3D avatar corresponds to a projection of the synthetic 3D avatar and comprises an image of a synthetically generated human head.

13. The method according to claim 1, wherein training the neural network further comprises
- for each 2D object image, calculating a set of 2D object parameters, wherein the 2D object parameters correspond to facial recognition embedding;
- storing the respective 2D object parameters and the plurality of 3D object parameters for each synthetic 3D avatar; and
- training the neural network based on the stored 2D object parameters and 3D object parameters pairs.

14. The method according to claim 1, further comprising using the trained neural network to output 3D object parameters given an input of 2D object parameters.

15. The method according to claim 1,
wherein the benchmark 3D head model comprises a morphable head model and
wherein the 3D object parameters comprise a plurality of blend shapes, said blend shapes representing a plurality of morphable facial regions.

16. A system for generating a 3D avatar, the system comprising
- a processing component configured to
  - receive a 2D image comprising an object of interest comprising a face;
  - calculate a set of 2D parameters of the object of interest; and
- a trained neural network configured to
  - receive the set of 2D parameters;
  - output an estimated set of 3D avatar parameters, said parameters representing deviations with respect to 3D parameters of a benchmark 3D head model; and
- wherein the processing component is further configured to apply the set of 3D avatar parameters to the benchmark 3D head model to obtain the 3D avatar; and
- a training processor configured to:
  - randomize the plurality of 3D parameters of the benchmark 3D head model within predetermined parameter ranges to generate a plurality of synthetic 3D avatars representative of human heads;
  - for each synthetic 3D avatar, create a corresponding 2D object image; and
  - train the neural network based on the synthetic 3D avatars and their corresponding 2D object images.

17. The system according to claim 16, further comprising a training database configured to store the plurality of synthetic 3D avatars for training the neural network.

18. The system according to claim 16, further comprising an output component configured to output the 3D avatar and wherein the output component comprises a graphical interface.

19. The system according to claim 16, further comprising an input component configured to capture and input 2D image to the processing component and wherein the input component comprises a user-operated device.

* * * * *